(12) United States Patent
Chen et al.

(10) Patent No.: US 10,470,181 B2
(45) Date of Patent: Nov. 5, 2019

(54) DETECTING DM-RS IN PORTIONS OF SIGNALS

(71) Applicant: QUALCOMM Incorporated, San Diego, CA (US)

(72) Inventors: Wanshi Chen, San Diego, CA (US); Peter Gaal, San Diego, CA (US); Shimman Patel, San Diego, CA (US); Juan Montojo, San Diego, CA (US); Hao Xu, Beijing (CN); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/116,083

(22) Filed: Aug. 29, 2018

(65) Prior Publication Data

US 2018/0376477 A1 Dec. 27, 2018

Related U.S. Application Data

(63) Continuation of application No. 15/368,444, filed on Dec. 2, 2016, now Pat. No. 10,085,256.

(Continued)

(51) Int. Cl.
*H04W 72/04* (2009.01)
*H04L 5/00* (2006.01)
*H04L 25/02* (2006.01)

(52) U.S. Cl.
CPC ....... *H04W 72/0446* (2013.01); *H04L 5/0048* (2013.01); *H04L 5/0051* (2013.01);
(Continued)

(58) Field of Classification Search
CPC .......... H04W 72/0446; H04W 72/0406; H04L 5/0051; H04L 5/0048; H04L 25/0228; H04L 5/0042; H04L 5/0014
See application file for complete search history.

(56) References Cited

U.S. PATENT DOCUMENTS

2013/0034178 A1 2/2013 Hu et al.
2013/0114555 A1 5/2013 Sato
(Continued)

FOREIGN PATENT DOCUMENTS

JP 2007336494 A 12/2007
JP 2009212597 A 9/2009
(Continued)

OTHER PUBLICATIONS

Intel Corporation: "Aspects to Consider for DL Transmission of TTI Shortening", 3GPP Draft, R1-160436, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 14, 2016 (Feb. 14, 2016), XP051053772, Retrieved from the Internet: URL: http://www.3gpp.org/ftp/Meetings_3GPP_SYNC/RAN1/Docs/ [retrieved on Feb. 14, 2016], 4 pages.

(Continued)

*Primary Examiner* — Omar J Ghowrwal
(74) *Attorney, Agent, or Firm* — Anthony R. Morris

(57) ABSTRACT

Aspects of the present disclosure generally relate to a conditional utilization of reference signals for managing communications of one or more user equipment (UE) in a wireless communications system. The described aspects include receiving a transmission having a first subframe slot and a second subframe slot, at least one of the first subframe slot and the second subframe slot have a single-slot transmission time interval (TTI). The described aspects further include detecting a first demodulation reference signal (DM-RS) in the first subframe slot and a second DM-RS in the second subframe slot. The described aspects further include determining whether to demodulate the at least one downlink channel in the first subframe slot using the first DM-RS in the first subframe slot or to demodulate both the first (Continued)

DM-RS in the first subframe slot and the second DM-RS in the second subframe slot based on whether at least one condition exists.

22 Claims, 12 Drawing Sheets

Related U.S. Application Data

(60) Provisional application No. 62/295,745, filed on Feb. 16, 2016.

(52) U.S. Cl.
CPC ....... *H04W 72/0406* (2013.01); *H04L 5/0014* (2013.01); *H04L 5/0042* (2013.01); *H04L 25/0228* (2013.01)

(56) References Cited

U.S. PATENT DOCUMENTS

| | | |
|---|---|---|
| 2014/0254509 A1 | 9/2014 | Chen et al. |
| 2015/0009870 A1 | 1/2015 | Bashar et al. |
| 2017/0238312 A1 | 8/2017 | Chen et al. |

FOREIGN PATENT DOCUMENTS

| | | |
|---|---|---|
| JP | 2011514791 A | 5/2011 |
| JP | 2013038802 A | 2/2013 |

OTHER PUBLICATIONS

International Search Report and Written Opinion—PCT/US2017/012761—ISA/EPO—dated Apr. 4, 2017, 16 pages.

Lenovo: "Consideration on TTI Shortening for DL", 3GPP Draft, R1-161017, 3rd Generation Partnership Project (3GPP), Mobile Competence Centre, 650, Route Des Lucioles, F-06921 Sophia-Antipolis Cedex, France, vol. RAN WG1, No. St Julian's, Malta; Feb. 15, 2016-Feb. 19, 2016, Feb. 14, 2016 (Feb. 14, 2016), XP051054321, Retrieved from the Internet: URL:http://www.3gpp.org/ftp/Meetings_3GPP_SYNC/RAN1/Docs/ [retrieved on Feb. 14, 2016], 4 pages.

Nokia Networks., et al., "DMRS for PUSCH with Short TTI", 3GPP DRAFT, R1-160779, DMRS for PUSCH With STTI, 3rd Generation Partnership Project (3GPP), Mobile Competence Centre, 650, Route Des Lucioles, F-06921 Sophia-Antipolis Cedex, France, vol. RAN WG1, No. Malta, Feb. 15, 2016-Feb. 19, 2016, Feb. 5, 2016 (Feb. 5, 2016), XP051063888, Retrieved from the Internet: URL: http://www.3gpp.org/ftp/tsg_ran/WG1_RL1/TSGR1_84/Docs/, 7 pages.

Huawel., et al., "Short TTI for DL Transmissions", 3GPP TSG RAN WG1, Meeting #84, St Julian's, Malta, R1-160292, Feb. 15-19, 2016, 7 pgs, XP051053632, Retrieved from the Internet: URL: http://www.3gpp.org/ftp/tsg_ran/WG1_RL1/TSGR1_84/Docs/R1-160292.zip [retrieved on Feb. 14, 2016].

Huawei H., et al., "Discussion on UL RS for short TTI", 3GPP TSG-RAN WG1#84 R1-160740, Feb. 6, 2016, 4 Pages, URL:http://www.3gpp.org/ftp/tsg_ran/WG1_RL1/TSGR1_84/Docs/R1-160740.zip.

Intel Corporation: "On Multiplexing of PDSCH with different TTIs and related Enhancements," 3GPP TSG-RAN WG1#84 R1-160862, 3GPP Draft; R1-160862, 3rd Generation Partnership Project (3GPP), Mobile Competence Centre; 650, Route Des Lucioles ; F-06921 Sophia-Antipolis Cedex ; France vol. RAN WG1, No. St Julian's, Malta; Feb. 15, 2016-Feb. 19, 2016 Feb. 6, 2016 (Feb. 6, 2016), XP051064411, Retrieved from the Internet: URL:http://www.3gpp.org/ftp/tsg_ran/WG1_RL1/TSGR1_84/Docs/R1-160862.zip [retrieved on Feb. 6, 2016], 3 pages.

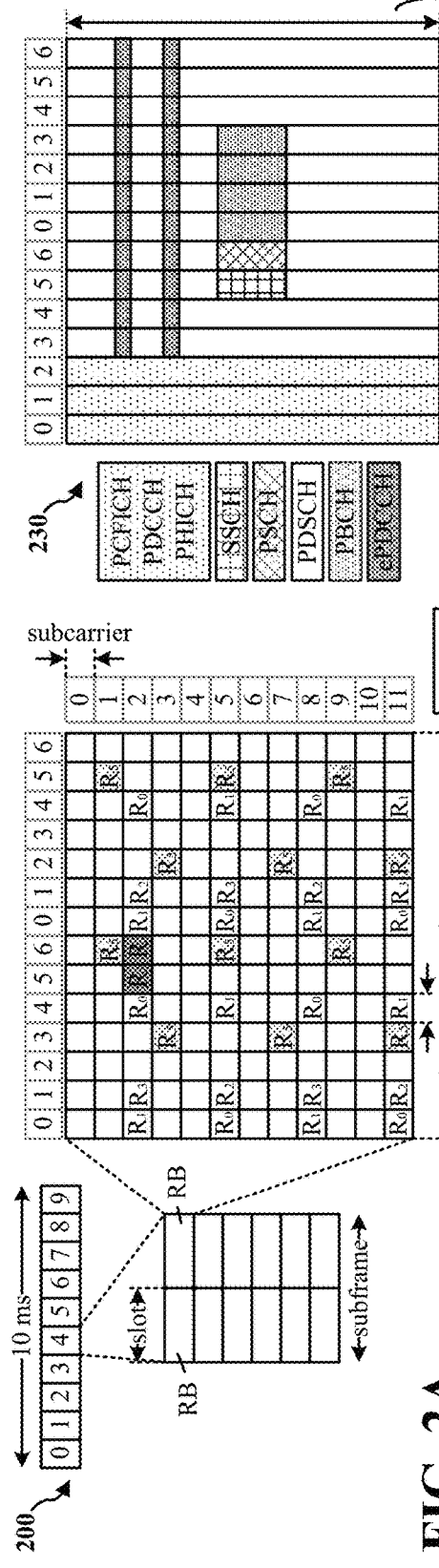
FIG. 2A
FIG. 2B
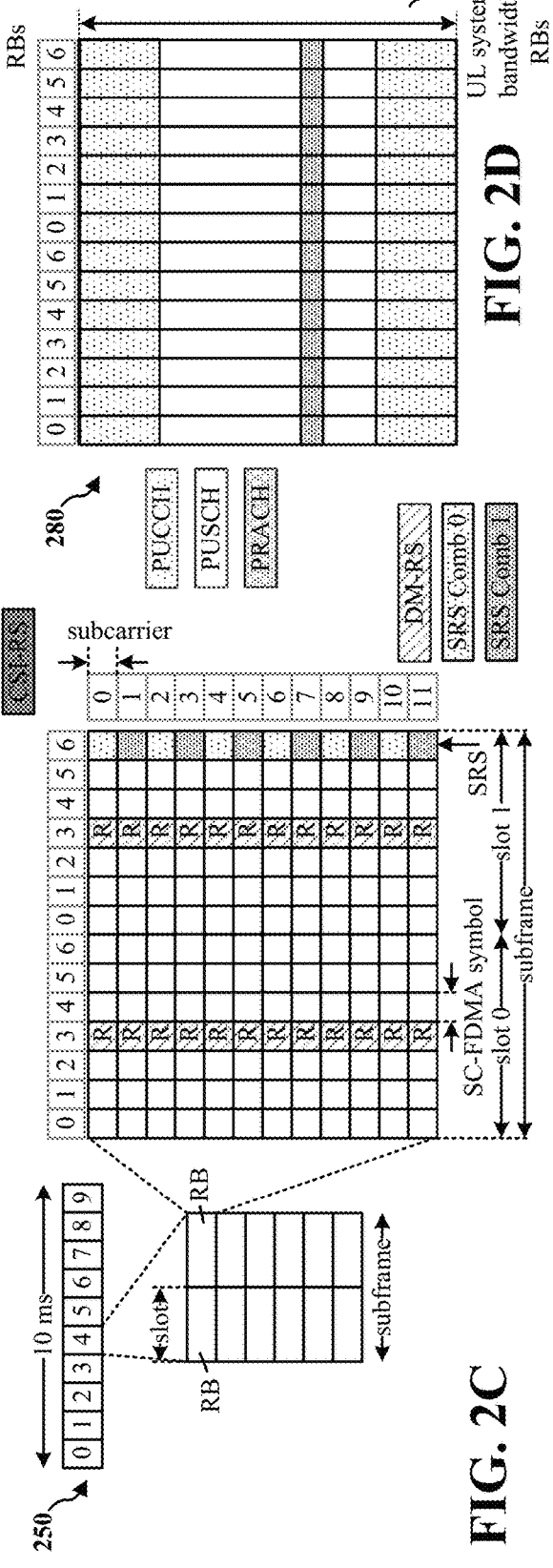
FIG. 2C
FIG. 2D

US 10,470,181 B2

DETECTING DM-RS IN PORTIONS OF SIGNALS

CROSS-REFERENCE TO RELATED APPLICATION(S)

This application is a Continuation of U.S. patent application Ser. No. 15/368,444, entitled "DOWNLINK OPERATIONS WITH SHORTENED TRANSMISSION TIME INTERVALS, and filed on Dec. 2, 2016, which claims the benefit of U.S. Provisional Application Ser. No. 62/295,745, entitled "DOWNLINK OPERATIONS WITH SHORTENED TRANSMISSION TIME INTERVALS," and filed on Feb. 16, 2016, all of which are expressly incorporated by reference herein in their entirety.

BACKGROUND

The present disclosure relates generally to communication systems, and more particularly, to downlink operations with shortened transmission time intervals (TTIs) for managing communications of one or more user equipment (UE) in a wireless communications system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In wireless communications systems employing legacy LTE, a plurality of UEs served by a particular eNodeB may receive data from the eNodeB over a shared downlink channel called the Physical Downlink Shared Channel (PDSCH). In addition, control information associated with the PDSCH may be transmitted to the UEs by the eNodeB via a Physical Downlink Control Channel (PDCCH) and/or an Enhanced PDCCH (ePDCCH). The control information included in the PDCCH or ePDCCH may include one or more uplink or downlink resource element (RE) grants for an LTE subframe. In legacy LTE, each LTE subframe has a transmission time interval (TTI) of 1 ms and is divided into two 0.5 ms slots. For example, UE specific reference signals (RSs) may be inserted into a transmission signal structure once synchronization between a UE and the eNodeB is complete. A UE specific RS may only be embedded in resource blocks (RBs) for which the PDSCH is mapped, and if transmitted, the UE is expected to use the RS to derive a channel estimate for demodulating data in the PDSCH RBs. The RS may provide a reference point for downlink power and may enable beamforming for transmissions between the UE and eNodeB. However, due to increasing complexities for resource scheduling, increased flexibility of RS management is desired for demodulation of a downlink communication channel.

As such, improvements in utilization of reference signals for managing communications of one or more UE in a wireless communications system are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes a conditional utilization of reference signals for managing communications of one or more UE in a wireless communications system. The described aspects include receiving a transmission having a first subframe slot and a second subframe slot, wherein at least one of the first subframe slot and the second subframe slot have a single-slot transmission time interval (TTI). The described aspects further include detecting a first demodulation reference signal (DM-RS) in the first subframe slot and a second DM-RS in the second subframe slot. The described aspects further include determining, via a processor, whether at least one condition exists for using the second DM-RS in the second subframe slot for demodulating the at least one downlink channel in the first subframe slot. The described aspects further include determining whether to demodulate the at least one downlink channel in the first subframe slot using the first DM-RS in the first subframe slot or to demodulate both the first DM-RS in the first subframe slot and the second DM-RS in the second subframe slot based on whether the at least one condition exists.

In another aspect, an apparatus for conditional utilization of reference signals for managing communications of one or more UE in a wireless communications system may include a transceiver, a memory; and at least one processor coupled to the memory and configured to receive, via the transceiver, a transmission having a first subframe slot and a second subframe slot, wherein at least one of the first subframe slot and the second subframe slot have a single-slot TTI. The described aspects further detect a first DM-RS in the first subframe slot and a second DM-RS in the second subframe slot. The described aspects further determine whether at least one condition exists for using the second DM-RS in the second subframe slot for demodulating the at least one downlink channel in the first subframe slot. The described aspects further determine whether to demodulate the at least one downlink channel in the first subframe slot using the first DM-RS in the first subframe slot or to demodulate both the first DM-RS in the first subframe slot and the second DM-RS in the second subframe slot based on whether the at least one condition exists.

In another aspect, a computer-readable medium may store computer executable code for conditional utilization of reference signals for managing communications of one or more UE in a wireless communications system. The described aspects include code for receiving a transmission having a first subframe slot and a second subframe slot, wherein at least one of the first subframe slot and the second subframe slot have a single-slot TTI. The described aspects further include code for detecting a first DM-RS in the first subframe slot and a second DM-RS in the second subframe slot. The described aspects further include code for determining, via a processor, whether at least one condition exists for using the second DM-RS in the second subframe slot for demodulating the at least one downlink channel in the first subframe slot. The described aspects further include code for determining whether to demodulate the at least one downlink channel in the first subframe slot using the first DM-RS in the first subframe slot or to demodulate both the first DM-RS in the first subframe slot and the second DM-RS in the second subframe slot based on whether the at least one condition exists.

In another aspect, an apparatus for conditional utilization of reference signals for managing communications of one or more UE in a wireless communications system may include means for receiving a transmission having a first subframe slot and a second subframe slot, wherein at least one of the first subframe slot and the second subframe slot have a single-slot TTI. The described aspects further include means for detecting a first DM-RS in the first subframe slot and a second DM-RS in the second subframe slot. The described aspects further include means for determining, via a processor, whether at least one condition exists for using the second DM-RS in the second subframe slot for demodulating the at least one downlink channel in the first subframe slot. The described aspects further include means for determining whether to demodulate the at least one downlink channel in the first subframe slot using the first DM-RS in the first subframe slot or to demodulate both the first DM-RS in the first subframe slot and the second DM-RS in the second subframe slot based on whether the at least one condition exists.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
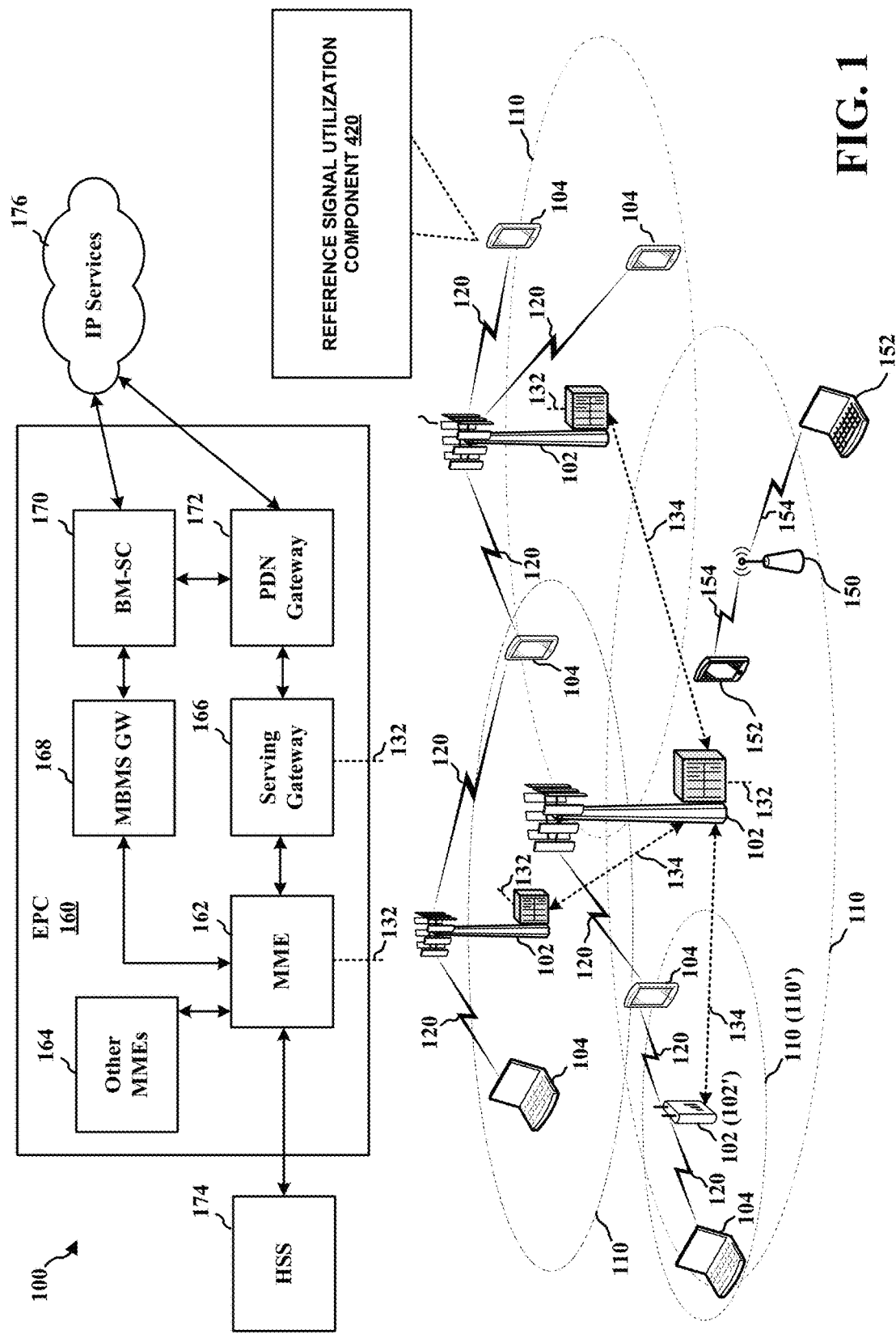
FIG. 1 is a diagram illustrating an example of a wireless communications system and an access network including a UE having an aspect of a reference signal utilization component as described herein for managing conditional utilization of reference signals in one slot for a received transmission in another slot in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present disclosure relates to managing usage of downlink reference signals, e.g., DM-RS, received in one slot for demodulating transmissions received in another slot, referred to herein as conditional DM-RS utilization, for one or more UEs. The data structures of the present disclosure may include one or more resource element blocks into which a frequency bandwidth of one or more downlink channels is divided within a slot of an LTE subframe. Once synchronization between a UE and a base station has completed, the base station may insert one or more UE specific reference signals (e.g., DM-RS) into a transmission signal structure on the downlink channel. For example, according to the present aspects, the reference signals may be embedded in both the resource elements of a first slot and a second slot of the LTE subframe. The UE operating according to the present aspects may, based on detecting at least one condition (e.g., an explicit indication, an implicit indication, a radio resource control configuration, or downlink control format information), determine whether the reference signals received in one of the slots may be used for demodulating a transmission on the other one of the slots. In other words, for example, the UE of the present aspects is able to determine whether to demodulate at least one downlink channel in the first subframe slot using a first DM-RS in the first subframe slot or using both the first DM-RS in the first subframe slot and a second DM-RS in the second subframe slot based on whether the at least one condition exists. For instance, if the transmission is successful, the UE may use the DM-RS to derive channel estimates for demodulating data in the PDSCH RBs. The present aspects may be useful, for example, in scenarios where a transmission in at least one of the first subframe slot and the second subframe slot has a single-slot TTI.

As such, the present methods and apparatus may enable conditional usage of reference signals from one slot to demodulate a received downlink channel in another slot during wireless communications. Accordingly, in some aspects, the present methods and apparatus may provide an efficient solution, as compared to current solutions, for example, to enable the network (e.g., eNB) to provide additional reference signals to the UE, and/or for the UE to utilize additional reference signals in order to improve channel estimation and demodulation of received transmissions.

FIG. 1 is a diagram illustrating an example of a wireless communications system and an access network 100 including at least one UE 104 configured to include reference signal utilization component 420 for managing usage of reference signals in one slot for a received transmission in another slot in accordance with various aspects of the present disclosure. The wireless communications system 100 (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a WI-FI access point (AP) 150 in communication with WI-FI stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the WI-FI AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire™.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 102 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 102 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a DL frame structure in LTE, which may be an example of a frame structure that may be received by at least one UE 104 configured to include reference signal utilization component 420 for managing usage of reference signals in one slot for a received transmission in another slot in accordance with various aspects of the present disclosure. FIG. 2B is a diagram 230 illustrating an example of channels within the DL frame structure in LTE that may be used by UE 104 as described herein. FIG. 2C is a diagram 250 illustrating an example of an UL frame structure in LTE that may be used by UE 104. FIG. 2D is a diagram 280 illustrating an example of channels within the UL frame structure in LTE that may be used by UE 104. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
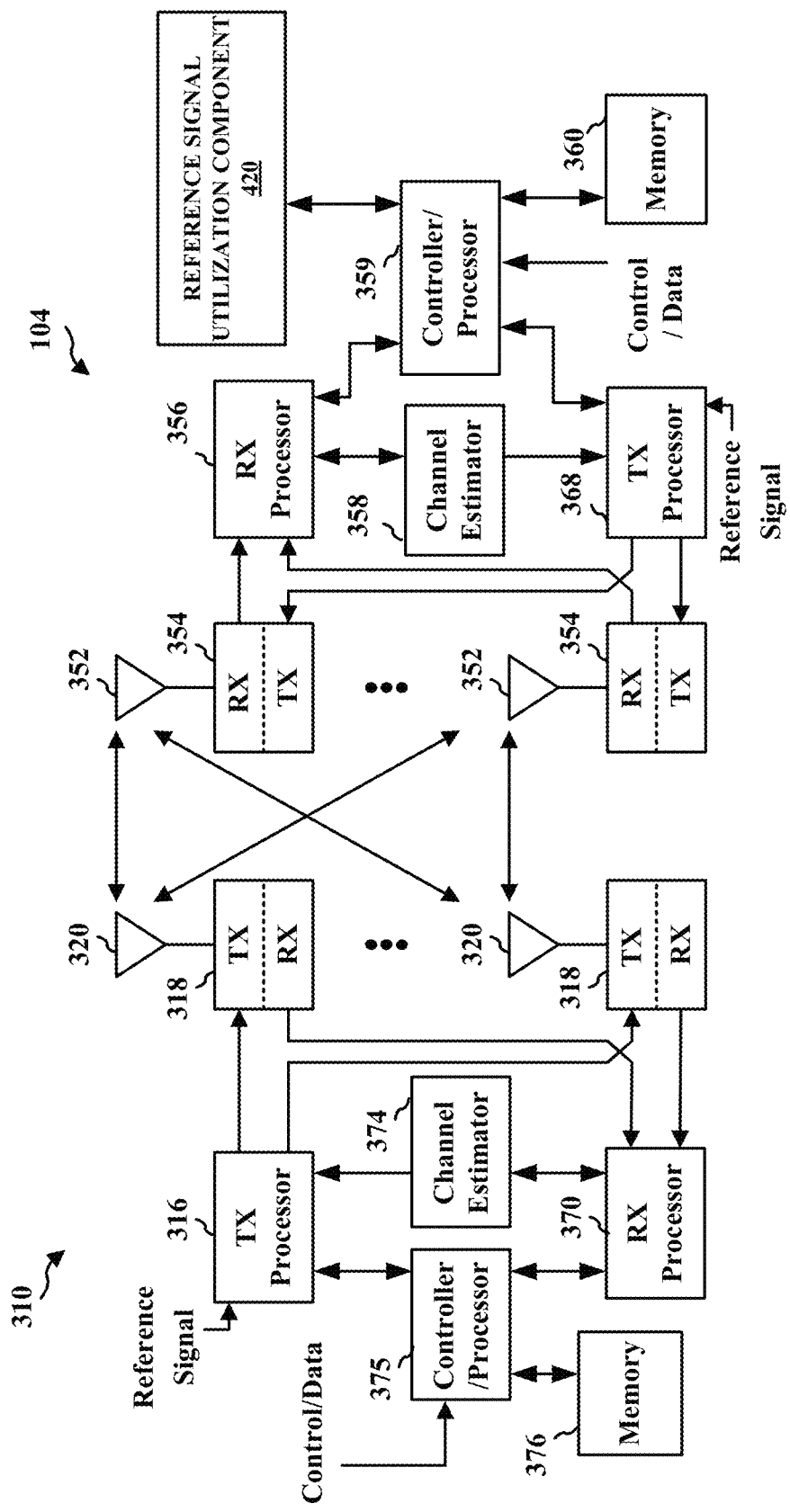
FIG. 3 is a diagram illustrating an example of an evolved Node B (eNB) and user equipment (UE) in an access network, where the UE includes an aspect of a reference signal utilization component as described herein for managing conditional utilization of reference signals in one slot for a received transmission in another slot and/or corresponding in accordance with various aspects of the present disclosure.

FIG. 3 is a block diagram of an eNB 310 in communication with UE 104 in an access network. In an aspect, UE 104 may be configured to include reference signal utilization component 420, which is described in more detail below with respect to FIG. 4. In an aspect, reference signal utilization component 420 may be configured to manage usage of reference signals in one slot for a received transmission in another slot. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
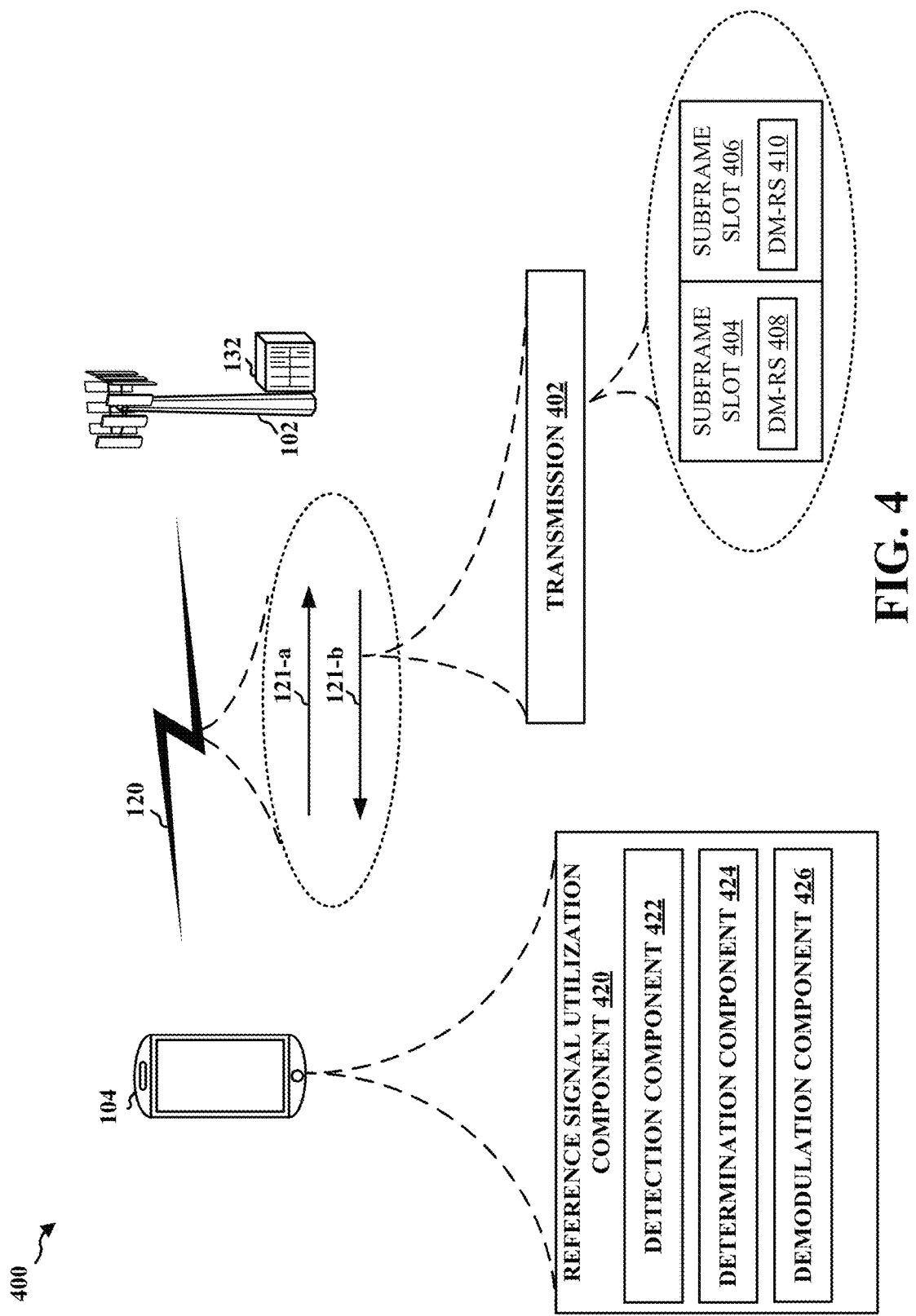
FIG. 4 is a schematic diagram of a wireless communications system including a user equipment having an aspect of a reference signal utilization component for managing conditional utilization of reference signals in one slot for a received transmission in another slot and/or corresponding in accordance with various aspects of the present disclosure.

Referring to FIG. 4, in an aspect, a wireless communications system 400 (which may be the same as or similar to wireless communications system and an access network 100 of FIG. 1) includes at least one UE 104 in communication coverage of at least one base station 102. The base station 102 (collectively referred to as Evolved Universal Mobile Telecommunications System (UMTS) Terrestrial Radio Access Network (E-UTRAN)) may interface with an EPC (such as EPC 160 of FIG. 1) through backhaul links 132 (e.g., S1 interface). In an aspect, UE 104 may include one or more processors (not shown) and, optionally, memory (not shown), that may operate in combination with reference signal utilization component 420 to manage conditional reference signal (e.g., DM-RS) utilization of reference signals in one slot for a received transmission in another slot, including downlink channel demodulation of such transmission using such reference signals during wireless communication. The wireless communications between UE 104 and base station 102 may include signals transmitted by either the base station 102 or the UE 104 via communication link 120. For example, wireless communications may include one or more downlink channels 121-b transmitted by base station 102 to UE 104, and one or more uplink channels 121-a transmitted by UE 104 to base station 102.

In an aspect, base station 102 may insert one or more UE specific reference signals (e.g., DM-RS) into a transmission signal 402 structure on the downlink channel 121-b. For example, the DM-RS exists on the physical layer and delivers a reference point for downlink power in which the UE determines the downlink power by measuring the power of the reference signal (e.g., DM-RS). The DM-RS is carried by a plurality of resource elements (REs) in each subframe slot and the location of these REs are determined by an antenna port configuration. More specifically, according to the present aspects, base station 102 may transmit a first demodulation reference signal (DM-RS) in a first subframe slot and a second DM-RS in a second subframe slot of a transmission, where the conditional reference signal utilizations aspects of the present disclosure may allow the DM-RS in one slot to be used by UE 104 for demodulating the transmission received in a different slot.

In this aspect, UE 104 and/or reference signal utilization component 420 may receive transmission 402 on downlink channel 121-b of communication link 120 from base station 102. The transmission 402 may have a first subframe slot 404 and a second subframe slot 406. In some instances, at least one of subframe slot 404 and subframe slot 406 may have a single-slot transmission time interval (TTI). Further, each of subframe slot 404 and subframe slot 406 may include one or more reference signals. For example, subframe slot 404 may include DM-RS 408, and subframe slot 406 may include DM-RS 410. Additionally, subframe slot 404 and subframe slot 406 may be located in a same subframe, or each of subframe slot 404 and subframe slot 406 may be located in a different subframe. In some instances, subframe slot 404 may precede in time subframe slot 406, or in other instances, subframe slot 406 may precede in time subframe slot 404. In another aspect, subframe slot 404 may comprise a set of symbols including one or more symbols in a slot of a first subframe and one or more symbols in a slot of a second subframe. Moreover, DM-RS 408 and DM-RS 410 may be associated with a same group of antenna ports. In other instances, DM-RS 408 may correspond to a first group of antenna ports and DM-RS 410 may correspond to a second group of antenna ports that are different from the first group of antenna ports. DM-RS 408 and DM-RS 410 may be associated with an orthogonal cover code (OCC) of length 2 or of length 4. In some instances, DM-RS 408 and DM-RS 410 may each be associated with a different length of an OCC. Further, a same precoding and power may be used for both the DM-RS 408 in the subframe slot 404 and the DM-RS 410 in the subframe slot 406.

In an aspect, UE 104 and/or reference signal utilization component 420 may include detection component 422, which may be configure to detect a DM-RS 408 in the subframe slot 404 and a DM-RS 410 in the subframe slot 406. For example, detection component 422 may detect DM-RS 408 in at least one resource block of subframe slot 404. Detection component 422 may also detect DM-RS 410 in at least one resource block of subframe slot 406.

In another aspect, UE 104 and/or reference signal utilization component 420 may include determination component 424, which may be configured to determine whether at least one condition exists for using the DM-RS 410 in the subframe slot 406 for demodulating the at least one downlink channel 121-*b* in the subframe slot 404. For example, determination component 424 may determine whether a condition exists for each of the at least one resource block of the subframe slot 404 and for each of the at least one resource block of the subframe slot 406. In some aspects, for example, the condition comprises an indication to use the DM-RS 410 in the subframe slot 406 for demodulating the downlink channel 121-*b* in the subframe slot 404, or the condition comprises an indication to use the DM-RS 408 in the subframe slot 404 for demodulating the downlink channel 121-*b* in the subframe slot 406. The indication to use the DM-RS from one subframe slot for demodulating the downlink channel 121-*b* in another subframe slot may further comprise at least one of a known radio resource control (RRC) configuration associated with using such other DM-RS, or a known downlink control information (DCI) format associated with using such other DM-RS. Further, the indication to use other DM-RS may also include an identifier of other resource elements in a same slot to be used for demodulation. In other instances, the indication may be implicit in that the indication to use the DM-RS from one subframe slot to demodulate a received transmission in another subframe slot includes an implicit indication associated with using the DM-RS. The implicit indication may comprise at least one of a known rank transmission scheduled in one of the subframe slots 404 or 406, or a control signal transmitted in one of the subframe slots, e.g., the subframe slot 406, for a scheduled data transmission in the other subframe slot, e.g., subframe slot 404.

In an example of rank adaptation, the same rank may be used for the two slots in a same subframes or at least the same group of antenna ports across the two slots. If the first slot uses only the first group of antenna ports (e.g., 7, 8, 11, 13), the second slot can also use the same group even though it may use a different port index or a set of ports in the group. If the first slot uses two groups of antenna ports, the second set also needs to use two groups.

Moreover, if rank adaptation is supported over two slots in a same subframe, PDSCH rate matching may assume both groups of DM-RS REs instead of a single group of DM-RS REs even if only a group of DM-RS REs are needed for the transmission in a given slot. For example, in slot 0, if rank 1/port 7 QPDSCH is scheduled, then only the first group of DM-RS REs is required in slot 0. In slot 1, if rank 3/ports 7-9 QPSDCH is scheduled, then both groups of DM-RS REs are required in both slot 0 and slot 1. As a result, even in slot 0, the UE 104 may be indicated to rate match around DM-RS REs for the two groups.

Further, determination component 424 may determine whether to demodulate the at least one downlink channel 121-*b* in, for example, the first subframe slot 404 using the first DM-RS 408 in the first subframe slot 404 or using both the first DM-RS 408 in the first subframe slot 404 and the second DM-RS 410 in the second subframe slot 406 based on whether the at least one condition exists.

In an aspect, UE 104 and/or reference signal utilization component 420 may include demodulation component 426, which may be configured to demodulate the downlink channel 121-*b* in, for example, the subframe slot 404 using the DM-RS 408 in the subframe slot 404 or both the DM-RS 408 in the subframe slot 404 and the DM-RS 410 in the subframe slot 406. Moreover, UE 104 and/or reference signal utilization component 420 may receive a power difference indication that identifies a power difference between the subframe slot 404 and the subframe slot 406. Demodulation component 426 may demodulate the DM-RS 408 in the subframe slot 404 and the DM-RS 410 in the subframe slot 406, respectively, based on the power difference.

Further, UE 104 and/or reference signal utilization component 420 may perform channel rate matching around the DM-RS 408 and the DM-RS 410 in the subframe slot 406 when at least one channel scheduled in the subframe slot 406 is transmitted with a set of antenna ports in an antenna port group different from the antenna port group in the subframe slot 406.

In some aspects, UE 104 and/or reference signal utilization component 420 may scale a transport block size (TBS) based on resource availability. For example, UE 104 and/or reference signal utilization component 420 may determine resource availability in the subframe slot 404 corresponding to a number of available resource elements for a data channel. Once determined, UE 104 and/or reference signal utilization component 420 may compare the resource availability with a threshold, and scale a transport block size (TBS) for the subframe slot 404 based on the comparison. In some instances, the threshold is at least one of a predetermined value or a value indicated by a network.

In an example, a first slot has a legacy control region while a second slot does not. As a result, the resource availability is different in slot 0 and slot 1. In one example use case, for instance, assuming 3 legacy control symbols, and a two-port CRS, slot 0 will have available REs/RB of (7×12 total available)−(3×12 legacy control)−4 for CRS=44 REs, while slot 1 will have available REs/RB of: (7×12)−(4×2)=76 REs. Further, the TBS table is typically designed based on an assumption of 120 REs. Therefore, using the existing TBS table, a scaling factor of 44/120~0.37 and 76/120~0.63 can be used for slot 0 and slot 1, respectively.

Further, special subframes in TDD, control region size, RS type (DM-RS compared to CRS), and CSI-RS may further impact resource availability. For example, if the legacy control region is only 1 symbol, then in slot 0 there may be 7×12−12=72 REs available in a RB, and, as such, a scaling factor of 72/120=0.6 may be used. Similarly, for example, if 2 legacy control symbols are used, then 60 REs would be available, and a scaling factor of 60/120=0.5 may be used. In another example, if DM-RS is present in slot 0 of 3 control symbols, then only 44−12=32 REs are available, and for the $2^{nd}$ slot, the available number of REs reduces from 76 to 64 REs. Also, for slot 1, if CSI-RS is further present (up to 32 REs), then only 32 REs will be available for QPDSCH.

Accordingly, due to the shortened TTI of the present aspects, UE 104 may not use a single scaling factor in all cases. Instead, the scaling factor used by UE 104 may depend on the slot (e.g., slot 0 and slot 1) and/or the RS type (CRS vs. DM-RS). As such, UE 104 may utilize two or more scaling factors, and may compare available resources with one or more thresholds in order to determine which scaling factor to use. In a case where two factors are sufficient, then one threshold is sufficient. In one non-limiting example, for instance, if the scaling factors are 0.6 and 0.3, respectively, and the threshold is 54 available REs, then if the available number of REs is 54 or higher, the scaling factor of 0.6 is used, otherwise, the scaling factor of 0.3 is used In an aspect, UE 104 and/or reference signal utilization component 420 may share a hybrid automatic repeat request (HARQ) process. For example, UE 104 and/or reference signal utilization component 420 may share a HARQ process between at least one downlink channel 121-*b* having the single-slot TTI and at least one other downlink channel included in a downlink subframe, wherein the at least one other downlink channel has a subframe length TTI. Further, UE 104 and/or reference signal utilization component 420 may maintain at least one first HARQ process for the at least one downlink channel having the single-slot TTI (e.g., downlink channel 121-*b*). UE 104 and/or reference signal utilization component 420 may maintain at least one second HARQ process for at least one other downlink channel included in a downlink subframe, wherein the at least one other downlink channel has a subframe length TTI. UE 104 and/or reference signal utilization component 420 may partition a soft buffer for storing symbols for the at least one first HARQ process and the at least one second HARQ process.

In an example, for a 1 ms TTI and a single slot TTI, the same HARQ process may be shared. The soft buffer may be shared between the 1 ms TTI and a single-slot TTI. A transmission block (TB) may start with 1 ms TTI and be re-transmitted with a single-slot TTI, so as to more efficiently utilize downlink resources. Alternatively, a transmission block may not be allowed to be scheduled with different TTIs (e.g., must choose either a 1 ms TTI or a slot TTI). For the same HARQ process, if the indicated TTI length is changed, then the UE may assume a new transmission block while ignoring the new data indicator (NDI) bit.

Moreover, the soft buffer may be partitioned for managing slot-based and subframe based HARQ processes. For example, by assuming 8 HARQ processes in a component carrier (CC), and 8 soft buffers originally defined for 1 ms TTI, and by defining 2K soft buffers for slot TTI, then there may be (8−K) soft buffers available for 1-ms TTI HARQ processes and 2K soft buffers available for 1-slot TTI HARQ processes. That is, the remaining K soft buffers originally defined for 1-ms TTI are now each further partitioned to 2 soft buffers for 1-slot TTI HARQ processes. Thus, overall, 8−K+2K=8+K soft buffers may be configured, which can serve at least 8+K HARQ processes. In this example, the value of K can be configured, e.g., as 0, 1, 2, 3, 4, 5, 6, 7, or 8, and if K=0, then UE 104 may fall back to legacy buffer usage, whereas if K=8, then no 1-ms TTI unicast traffic is present.

Figure 5:
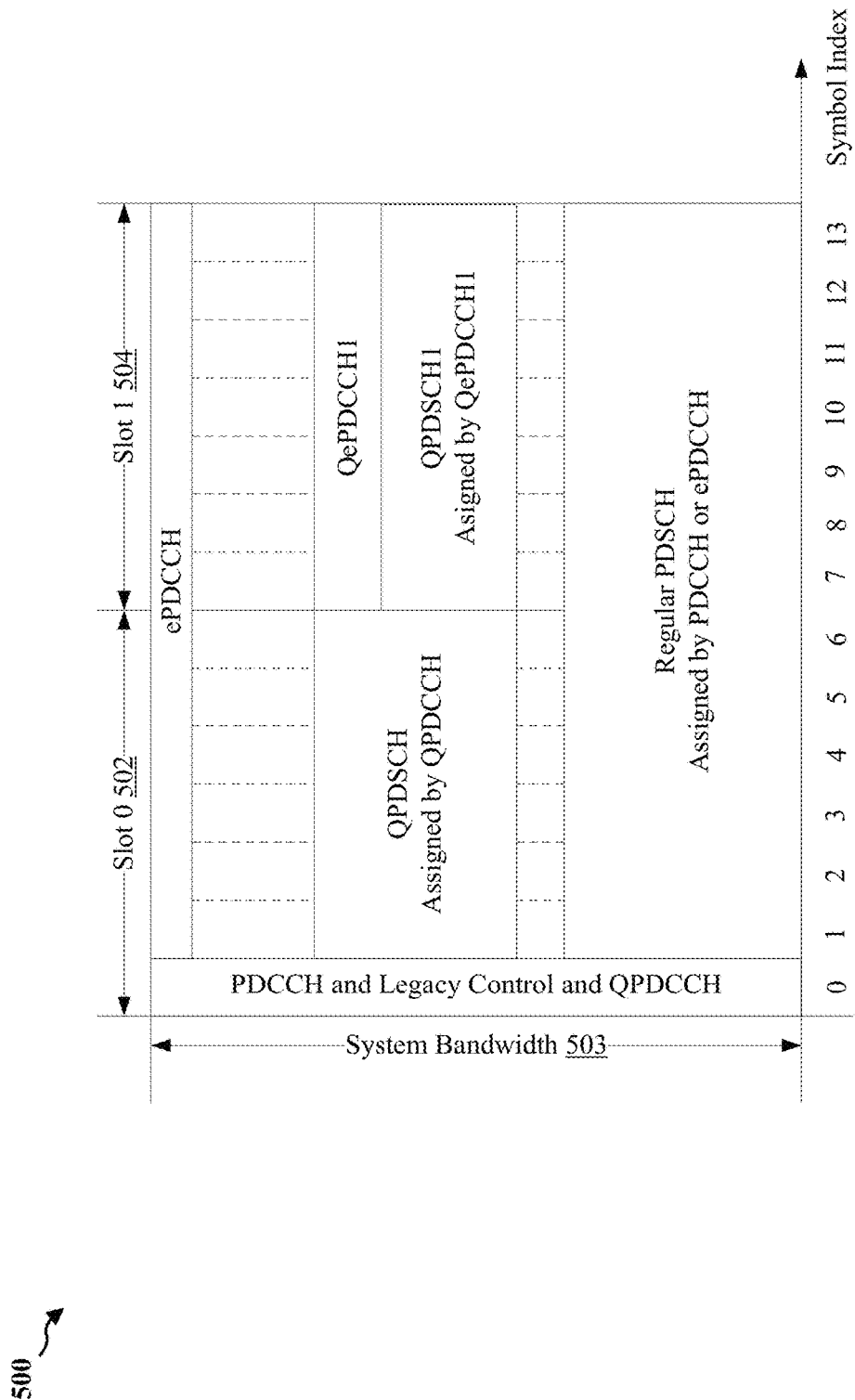
FIG. 5 is a diagram illustrating an aspect of a downlink subframe structure in accordance with various aspects of the present disclosure.

FIG. 5 is a diagram illustrating a non-limiting example of a downlink subframe structure 500 for UE communications in a wireless communications system such as system 100 (FIG. 1) or system 400 (FIG. 4) that supports a slot-based (e.g., 0.5 ms) TTI. In an aspect, downlink subframe structure 500 includes frame scheduling for an example LTE subframe, which is divided in the time domain (horizontally) into two slots (slot 0 502 and slot 1 504) and 14 symbols (symbols 0-13). Furthermore, the temporal duration (horizontal axis) of some resource element blocks of downlink subframe structure 500 may be one slot (0.5 ms TTI), whereas other resource element blocks may have a temporal duration of both slots (1 ms TTI). As such, by incorporating control and data channel resource element blocks having a TTI of one slot (0.5 ms), downlink subframe structure 500 allows for lower latency for downlink data transmissions relative to, for example, resource element blocks of legacy LTE downlink data structures, which have a mandated downlink data resource element block TTI of one subframe (1 ms). Furthermore, downlink subframe structure 500 provides for inter-operability with these existing legacy LTE data structures by allowing PDCCH, EPDCCH, and PDSCH resource element blocks to be scheduled along with the single-slot resource element blocks of the present disclosure.

In an aspect of the present disclosure, downlink subframe structure 500 may include one or more resource element blocks that each comprises one or more resource elements into which a system bandwidth 503 is divided. For example, in example downlink subframe structure 500, the resource element blocks that span one slot may correspond to a quick LTE channel having a one-slot TTI, which may include a QEPDCCH (quick control channel) or a QPDSCH (quick data channel). Alternatively, the resource element blocks that span both subframes may correspond to a PDSCH (legacy LTE data channel), which may be granted to a particular UE by a PDCCH (e.g., in a legacy control region), a QPDCCH (not shown), or an EPDCCH. In addition, a resource element block that spans both subframes may correspond to an EPDCCH (legacy LTE control channel), such as resource element block.

In an additional aspect, each of the one or more resource element blocks may comprise a control channel region or a data channel region. For example, resource element blocks associated with a QPDCCH, a QEPDCCH, an EPDCCH, or a PDCCH may each correspond to control channel regions. Alternatively, resource element blocks associated with a PDSCH or a QPDSCH may correspond to data channel regions.

In addition, the one or more control channel regions of the downlink subframe structure 500 may include one or more resource grants for one or more UEs served by one or shared downlink data channels. These downlink data channels may include a QPDSCH spanning a single slot of the subframe and/or a PDSCH spanning both slots of the subframe.

In an aspect, one or more of the control channel regions of the downlink subframe structure 500 may correspond to a control channel that spans a single slot of the subframe. Such a single-slot control channel of the present disclosure may be referred to herein as QEPDCCH, which may have similar aspects to those of the legacy EPDCCH. However, unlike the EPDCCH, which spans both slots of a subframe, the QEPDCCH spans a single slot of the subframe. In an aspect, the QEPDCCH may utilize the same or similar quick control channel elements (ECCE) resource elements as legacy EPDCCH, although resource elements may be added relative to the legacy EPDCCH to compensate for the shorter QEPDCCH timeframe. In other words, the aggregation level of the QEPDCCH may be increased relative to the legacy EPDCCH (e.g., by a factor of two) to maintain similar coverage.

Furthermore, control channel regions of downlink subframe structure 500 allocated to the QEPDCCH may include one or more uplink or downlink grants. In an additional aspect of the present disclosure, a control channel region of downlink subframe structure 500 may include a downlink channel grant for a data channel region resource element block that spans both slot 0 502 and slot 1 504 of the subframe.

Moreover, although the initial symbol (or symbols) of the subframe may contain the legacy control region, the symbol may also contain resource elements for a QPDCCH channel of the present disclosure. Accordingly, the QPDCCH may utilize the control channel element (CCE) structure of the legacy PDCCH and may be fully multiplexed with other legacy control channels of legacy control region. Furthermore, the QPDCCH may include one or more downlink resource grants for resource element blocks spanning either one or both slots of the subframe. In other words, the QPDCCH may include downlink resource grants for QPDSCH resource element blocks (spanning a single slot of the subframe, 0.5 ms TTI) or PDSCH resource element blocks (spanning both slots of the subframe, 1 ms TTI). In an additional aspect, as the QPDCCH may include downlink grants for resource element blocks for the single-slot QPDSCH or for the full-subframe PDCCH, the QPDCCH may include a downlink control indicator (DCI) that specifies whether a downlink channel grant is for a single slot or for a full subframe. Furthermore, though not explicitly shown in structure 500, like the legacy LTE PDCCH, the QPDCCH may include uplink grants in addition to downlink grants.

Furthermore, the resource element blocks that comprise data channel regions may correspond to resource element allocations for downlink transmission of user data to one or more UEs. In an aspect, these data channel regions may include resource element blocks allocated to downlink channels that transmit the user data over a single-slot or downlink channels that transmit the user data over both slots of the subframe.

Therefore, as illustrated in FIG. 5, downlink subframe structure 500 includes enhanced quick (e.g., slot-based or 0.5 ms TTI) LTE downlink resource element allocation structure for some resource element blocks that may implement a slot-based allocation scheme, thereby shortening (e.g., halving) the TTI relative to full-subframe-based legacy LTE downlink resource element allocation schemes. By utilizing this quick LTE downlink resource element allocation structure, over-the-air latency may be significantly reduced (e.g., by a factor of two). Accordingly, for example, a round-trip time (RTT) of a HARQ process using the enhanced LTE structure may be reduced to 4 ms from the 8 ms RTT of the legacy LTE RTT.

In an additional feature, downlink subframe structure 500 may allocate resource elements in a downlink subframe for UEs that utilize one or both of (a) the quick LTE channels of the present disclosure that span a single slot and may have a 0.5 ms TTI (e.g., QPDCCH, QEPDCCH, QPDSCH) and (b) legacy LTE channels that span the entire subframe and may therefore have a 1 ms TTI. In addition, because downlink subframe structure 500 mirrors the general 1 ms subframe structure of legacy LTE, introducing the enhanced LTE structure does not alter basic communication operations, such as, but not limited to, cell search procedures, system information block reading, random access channel (RACH) procedures (with media access channel (MAC) enhancements for contention-based RACH, paging, and idle mode procedures. Furthermore, UEs may easily indicate whether they support the enhanced LTE communication during connection setup (e.g., via a dedicated information element or message), and in response, a network entity (e.g., an eNB) may provide the configuration parameters for the enhanced LTE downlink and uplink channels.

Moreover, in some examples, cell-specific reference signal (CRS)-based demodulation may be utilized for the slot-based resource element allocation of the enhanced LTE structure to minimize its specification and implementation impact, as CRS-based demodulation is widely used in legacy LTE systems. Alternatively, demodulation reference signal (DM-RS)-based demodulation may be utilized. DMRS-based demodulation can allow for sufficient resources to be used for channel estimation for each slot of a subframe. For example, DM-RS allows for increased density, as a UE-specific reference signal (VERS) pattern defined for Time-Division Duplex (TDD) Downlink Pilot Time Slot (DwPTS) can be reused for both slots of a subframe. In addition, DMRS-based demodulation allows for UE combining across consecutive assignments. As both CRS and DM-RS-based demodulation are utilized by legacy LTE systems, utilizing these demodulation schemes for quick LTE communication allows for further increased compatibility.

In addition, by reducing transmission from one subframe of legacy LTE to one slot of the quick LTE structure of the present disclosure, the amount of resources for data transmission is effectively reduced by half. As such, to facilitate transmission of the same amount of data using the reduced resources available in a single slot, an increase in code rate (e.g., a doubled code rate) may be required. Alternatively or additionally, a number of resource blocks (RBs) (or resource elements) for a resource element block assignment may be increased (e.g., doubled). Therefore, where a resource element block assignment is compressed in time (e.g., changed from a subframe-based TTI to a single slot TTI), the number of resource RBs of the resource element block assignment may expanded. In addition, a two-resource-block minimum assignment may be mandated such that a similar code rate and transport block size can be maintained regardless of TTI size. However, where a one-RB minimum assignment is in place, a transport block size may be scaled by a factor of two. Alternatively, separate mapping rules may be provided for subframe-level (e.g., legacy LTE) assignments versus slot-level assignments (e.g., quick LTE) with respect to transport block size, modulation and coding scheme (MCS), and resource block size. In addition, slot 0 and slot 1 may have a different mapping or scaling.

Moreover, in some examples, the same subframe-level channel state information reference signal (CSI-RS) and interference measurement resource (IMR) may be used regardless of the TTI of a resource element block (e.g., same for both quick LTE and legacy LTE assignments). Alternatively, an eNB may generate a configuration whereby a CSI-RS and/or IMR are provided on a per-slot basis to provide greater granularity for slot-level assignments of quick LTE.

Therefore, the downlink subframe structure 500 of the present disclosure reduces over-the-air LTE latency by reducing the TTI interval of downlink channels while maintaining backward compatibility and coexistence with channels that utilize legacy LTE scheduling structures.

Moreover, according to the present aspects, UE 104 may utilize reference signals (e.g., DM-RS) association with EPDCCH and QEPDCCH according to one or more different configurations. One suitable configuration for QEPDCCH may include, for example, in slot 0, only using DM-RS in slot 0 (which may also be used in slot 1 of a previous subframe), and in slot 1, using both the DM-RS of slot 1 and the DM-RS of slot 0.

In addition, in order to better provide resource utilization in the spatial domain, the present aspects may introduce OCC4 for EPDCCH and QEPDCCH, e.g., for both the first group {7, 8, 11, 13} and the second group {9, 10, 12, 14}. In one suitable example, for instance, for a 1-ms EPDCCH, due to OCC4, ports 7-14 can be used for EPDCCH transmission. Further, in this example, the usage with respect to QEPDCCH may include: in slot 0, may utilize the DM-RS of slot 1 of a previous subframe, or, may rely on DM-RS of only slot 0 in which case only antenna ports 7, 8, 9, 10 are used; in slot 1, antenna ports 7-14 can be used. As such, in this example, QEPDCCH in slot 0 and in slot 1 may have different sets of antenna ports. Further, in this case, the data resources for EPDCCH and QEPDCCH may also be separated, for example, using a mixture of FDM and spatial domain multiplexing.

Figure 6:
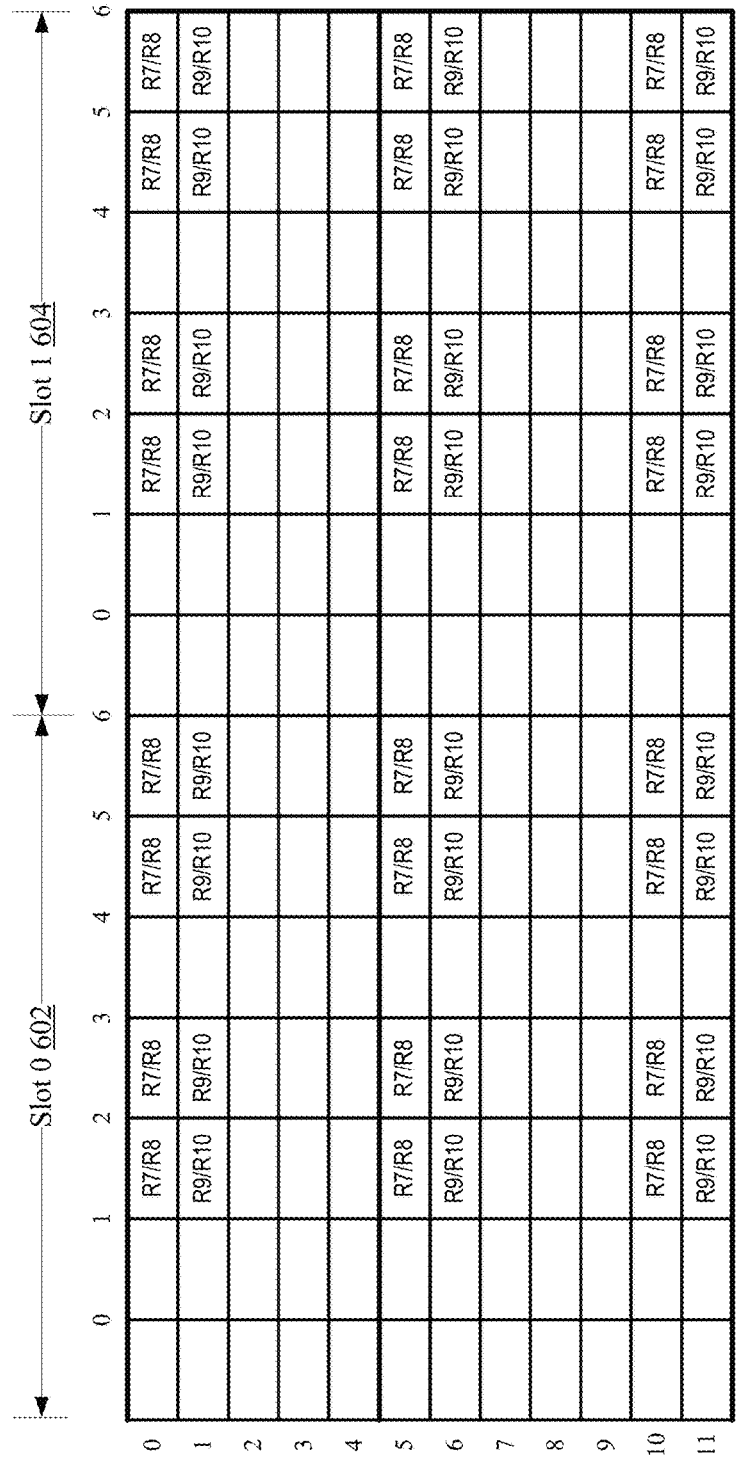
FIG. 6 is a diagram illustrating an aspect of a downlink subframe structure with DM-RS pattern for slot-TTI (e.g., 0.5 ms TTI) in accordance with various aspects of the present disclosure.

FIG. 6 is a diagram illustrating a non-limiting example of a downlink subframe structure 600 with a DM-RS pattern for slot-TTI (e.g., 0.5 ms TTI). Downlink subframe structure 600 may include one or more DM-RS in a pattern defined for Time Division Duplexing (TDD) Downlink Pilot Time Slot (DwPTS) for both slots of downlink subframe structure 600. For example, downlink subframe structure 600 corresponds to a subframe of an LTE frame including slot 0 602 and slot 1 604. One or more reference signals may be included on each subframe slot.

In an aspect, DM-RS may be Code Doman Multiplexed (CDM) in the time domain. For example, for rank 1 to rank 4, a spreading length of 2 may be used for the DM-RS. Further, antenna ports 7 and 8 are CDM along with antenna ports 9 and 10. Moreover, antenna ports 7 and 8 along with antenna ports 9 and 10 are Frequency Domain Multiplexed (FDM). For ranks 1 to 4, orthogonal cover code (OCC) may have a value of [1, 1], [1, −1]. For rank 5 to rank 8, a spreading length of 4 may be used. Further, the antenna ports may be divided into two groups. CDM group 1 may correspond to antenna ports 7, 8, 11, and 13, and CDM group 2 may correspond to antenna ports 9, 10, 12, and 14. CDM group 1 and CDM group 2 may be FDM. For ranks 5 to 8, OCC may have a value of [1, 1, 1, 1,], [1, −1, 1, −1], [1, 1, −1, −1], and [1, −1, −1, 1]. As such, for a slot TTI, there may be 1-strip of DM-RS or a 2-strip DM-RS. For 1-strip of DM-RS, in an example, DM-RS may be located in symbols 5 and 6 only. The 1-strip of DM-RS may only support up to rank 4 operations since CDM length 4 requires 4 symbols. For 2-strip of DM-RS, as depicted in downlink subframe structure 600, DM-RS may located in symbols 2 and 3 of slot 0 602 and symbols 5 and 6 of slot 1 604. The 2-strip DM-RS may support up to rank 8 operations.

Figure 7:
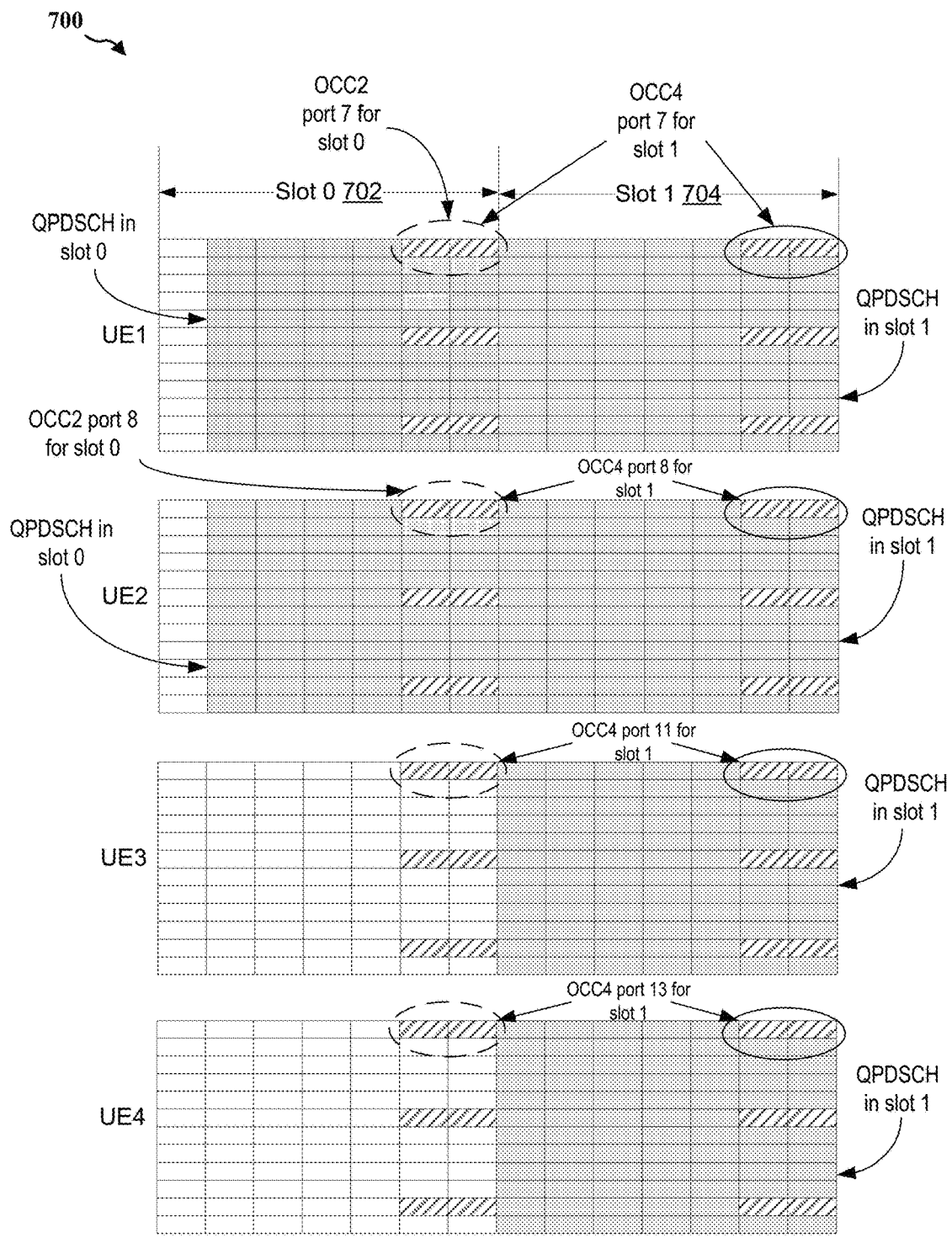
FIG. 7 is a diagram illustrating an aspect of a downlink subframe structure with different multi-user multiple-input multiple-output (MU-MIMO) in accordance with various aspects of the present disclosure.

FIG. 7 is a diagram illustrating a non-limiting example of a downlink subframe structure 700 for slot-based TTI with multi-user multiple-input and multiple-output (MU-MIMO) in both slots of a subframe, slot 0 702 and slot 1 704. In an aspect, downlink subframe structure 700 includes frame scheduling for LTE subframes for each of UE1, UE2, UE3, and UE4. Moreover, downlink subframe structure 700 may utilize a 3DMIMO design for slot TTI port management at least for slot 1. For instance, slot 0 702 may follow 3GPP Release 12 (Rel-12) antenna management instead of 3GPP Release 13 (Rel-13) antenna management, especially if DM-RS sharing across slots is only allowed within a subframe (not across subframes). In this case, slot 0 has less MU-MIMO multiplexing capability, inferior channel estimation, and a lower maximum number of layers than slot 1, and slot 0 may support up to rank 4 transmission, while slot 1 may support up to a rank 8 transmission. In this case, Rel-12 antenna management includes using only port 7 or port 8 for rank 1 transmissions, and for N>1 layers, only port 7 to port (7+N−1) can be used. Further, for Rel-12, a scrambling identifier (n_SCID) can be further set to 0 or 1 for rank 1 and rank 2 transmissions for a UE. Also, in this case, due to the introduction of 3DMIMO, for rank 1 transmissions Rel-13 antenna management includes, in additional to orthogonal code cover (OCC) length 2 based port 7 and port 8, using OCC length 4 based port 7, port 8, port 11 and port 13, where n_SCID can be further set to 0 or 1 for a UE. Further, for rank 2 transmissions, Rel-13 antenna management includes, in addition to OCC 2 based ports 7 and 8, using OCC4 based ports 7 and 8, and ports 11 and 13, where n_SCID can be further set to 0 or 1 for a UE. Alternatively, the present aspects may also consider additionally enabling one or more of ports 9, 10, 12, and 14 for rank 1/rank2 transmissions.

For instance, in the example represented by FIG. 7, in a same RB, for slot 0 702, UE1 and UE2 are in MU-MIMO while using DM-RS only in slot 0 702 with an OCC length 2. For slot 1 704, UE1, UE2, UE3, and UE4 are in MU-MIMO and use DM-RS in both slot 0 702 and slot 1 704 with an OCC length 4. For port 7 or port 8, an OCC length of 2 or 4 in a single slot may have the same OCC values of [1, 1] for port 7 or [1, −1] for port 8. In slot 0 702, the DM-RS for UE3 and UE4 may interfere with the DM-RS for UE1 and UE2. As such, according to the present aspects, different scrambling identifiers or power levels may be used. For example, UE 1 and UE2 may have a scrambling identifier value (e.g., n_SCID=0) different from UE3 and UE4 (e.g., n_SCID+1). Further, for example, UE1 and/or UE2 may have a higher power than UE3 and/or UE4. Alternatively, if different scrambling identifiers are used for UE1/UE2 and UE3/UE4 in slot 1 704, the DM-RS for these two pairs will not be completely orthogonal. As such, according to the present aspects, a new sequence mapping may be considered so that when different scrambling identifiers are used, the 4-symbol DM-RS for UE1, UE2, UE3, and UE4 are still orthogonal after OCC length 4 despreading. For example, for UE1/UE2 DM-RS, the mapped sequence in the four symbols may be X, Y, X, Y, while for UE3/UE4, the mapped sequence may be W, Z, −W, −Z.

Furthermore, with regard to downlink frame structure 700 or other similar slot-based TTI frame structures according to the present aspects, if group ACK is supported (e.g., QPDSCH is one slot while its ACK/NAK is based on 1-ms TTI), a transmission in slot 0 can further utilize DM-RS in slot 1. Thus, a transmission of greater than rank 4 or an OCC4 rank 1/rank2 transmission can be supported in slot 0.

Also, with regard to downlink frame structure 700 or other similar slot-based TTI frame structures according to the present aspects, if new DM-RS symbols are introduced, the present aspects may include providing an indication as to whether or not DM-RS are present in other symbols of the same slot (e.g., 2 and 3) for a transmission in slot 0 or slot 1, e.g., in addition to the DM-RS in symbols 5 and 6. It should be noted, however, that, in CSI-RS subframes, slot 1 DM-RS in symbols 2 and 3 may not be supported, and in this case the UE will fall back to using DM-RS in symbols 5 and 6 only.

Further, with regard to downlink frame structure 700 or other similar slot-based TTI frame structures according to the present aspects, the present aspects may include providing an indication as to whether or not DM-RS is further present in slot 0 for a transmission in slot 1. In some aspects, such an indication can be semi-static (e.g., RRC configuration) or dynamic (e.g., part of DCI). Alternatively, or additionally, in some aspects such an indication can also be implicit. In one non-limiting example of an implicit indication, if in slot 1, a rank 3 to rank 8 transmission is scheduled, the UE may assume that DM-RS is further present in symbol 5 and symbol 6 in slot 0. In another non-limiting example of an implicit indication, if the control resource used to schedule a transmission in slot 1 is transmitted in slot 0, then the UE can assume DM-RS to be present in slot 0.

Additionally, with regard to downlink frame structure 700 or other similar slot-based TTI frame structures according to the present aspects, the present aspects may include UE 104 receiving a slot 0 in subframe n to utilize DM-RS of slot 1 in subframe n−1. In this case, the OCC4 may follow the order of slot 0 in subframe n and slot 1 in subframe n−1. For example, if OCC4 is [1−1−1 1], then [−1 1] is used for slot 1 in subframe n=1, and [1−1] is used for slot 0 in subframe n, although subframe n−1 occurs first in time.

Moreover, with regard to downlink frame structure 700 or other similar slot-based TTI frame structures according to the present aspects, the present aspects may include that UE 104 may use the same precoding and power for the same port when UE 104 assumes a DM-RS from a different slot may be used for demodulation of the current slot. Although, it should be noted that the present aspects contemplate that it is possible to have different power for the two slots, in which case, the present aspects include eNB 102 providing UE 104 with an indication of the power difference.

Further, if UE 104 uses a DM-RS of another slot for demodulation of a current slot, then UE 104 may have to buffer the corresponding symbols in the other slot before decoding the control channel scheduling the current slot.

Figure 8:
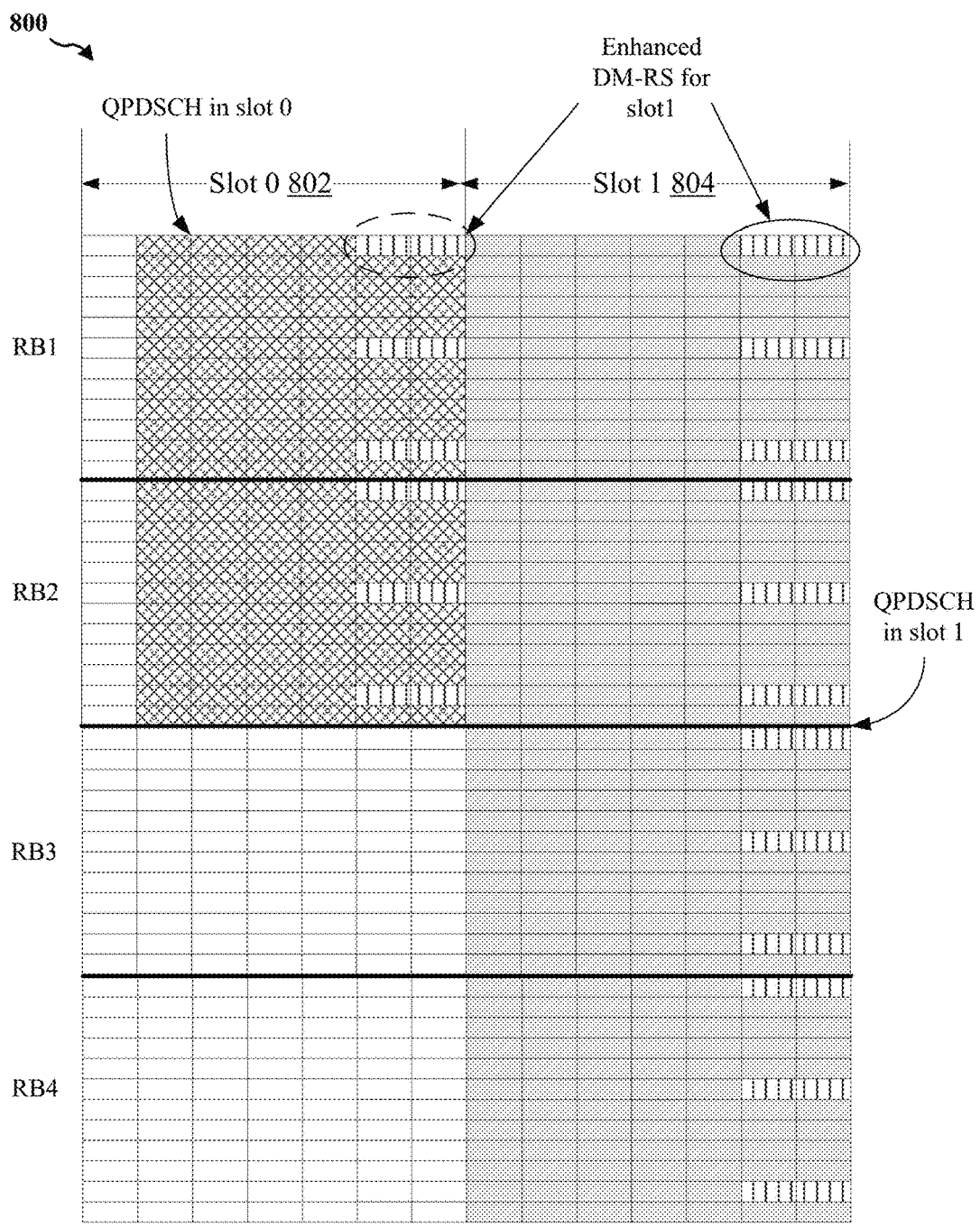
FIG. 8 is a diagram illustrating an aspect of a downlink subframe structure with DM-RS utilization across slots in accordance with various aspects of the present disclosure.

FIG. 8 is a diagram illustrating a non-limiting example of a downlink subframe structure 800 with DM-RS utilization across slots according to one or more of the present aspects. In an aspect, downlink subframe structure 800 includes frame scheduling for an example LTE subframe, wherein some of the REs carry DL reference (pilot) signals (DL-RS) for channel estimation at the UE. These reference signals may correspond to demodulation reference signals (DM-RS), which can be included in each slot of a subframe.

In an aspect, downlink subframe structure 800 corresponds to a subframe of an LTE frame including slot 0 802 and slot 1 804. One or more reference signals may be included on each subframe slot. For example, slot 0 802 may include a plurality of DM-RS on RB1 and RB2 while slot 1 804 includes a plurality of DM-RS on RB1, RB2, RB3, and RB4. As shown by the shaded blocks, a portion of RB1 and RB2 of slot 0 802 include QPDSCH. Similarly, all of RB1, RB2, RB3, and RB4 of slot 1 804 include QPDSCH, as illustrated by the shaded blocks. As such, for QPDSCH, conditional cross-slot utilization of DM-RS may be enabled on a per RB basis. For example, a UE, such as UE 104 (FIG. 4) configured to operate reference signal utilization component 420 may determine that at least one condition exists for using the DM-RS in the slot 1 804 for demodulating at least one downlink channel in the slot 0 802. In particular, a UE with QPDSCH in slot 0 802 in RB1 and RB2, and QPDSCH in slot 1 804 in RB1, RB2, RB3, and RB4, may utilize DM-RS in both slots for RB1 and RB2 for demodulating QPDSCH in slot 0 802 (e.g., referred to as enhanced DM-RS), but such an enhanced DM-RS is not available in RB3 and RB4 (and, hence, demodulation of QPDSCH in slot 1 801 may only use the DM-RS of slot 1). Further, for an antenna port, a same precoding technique may be assumed by a UE for DM-RS in the two slots (e.g., slot 0 802 and slot 1 804) of the same PRB pair in one subframe (and, possibly, over different subframes as well, e.g., depending on configuration). Moreover, if the precoding RB group (PRG) is enabled, a same precoding may also be assumed for RBs of the same PRG.

Figure 9:
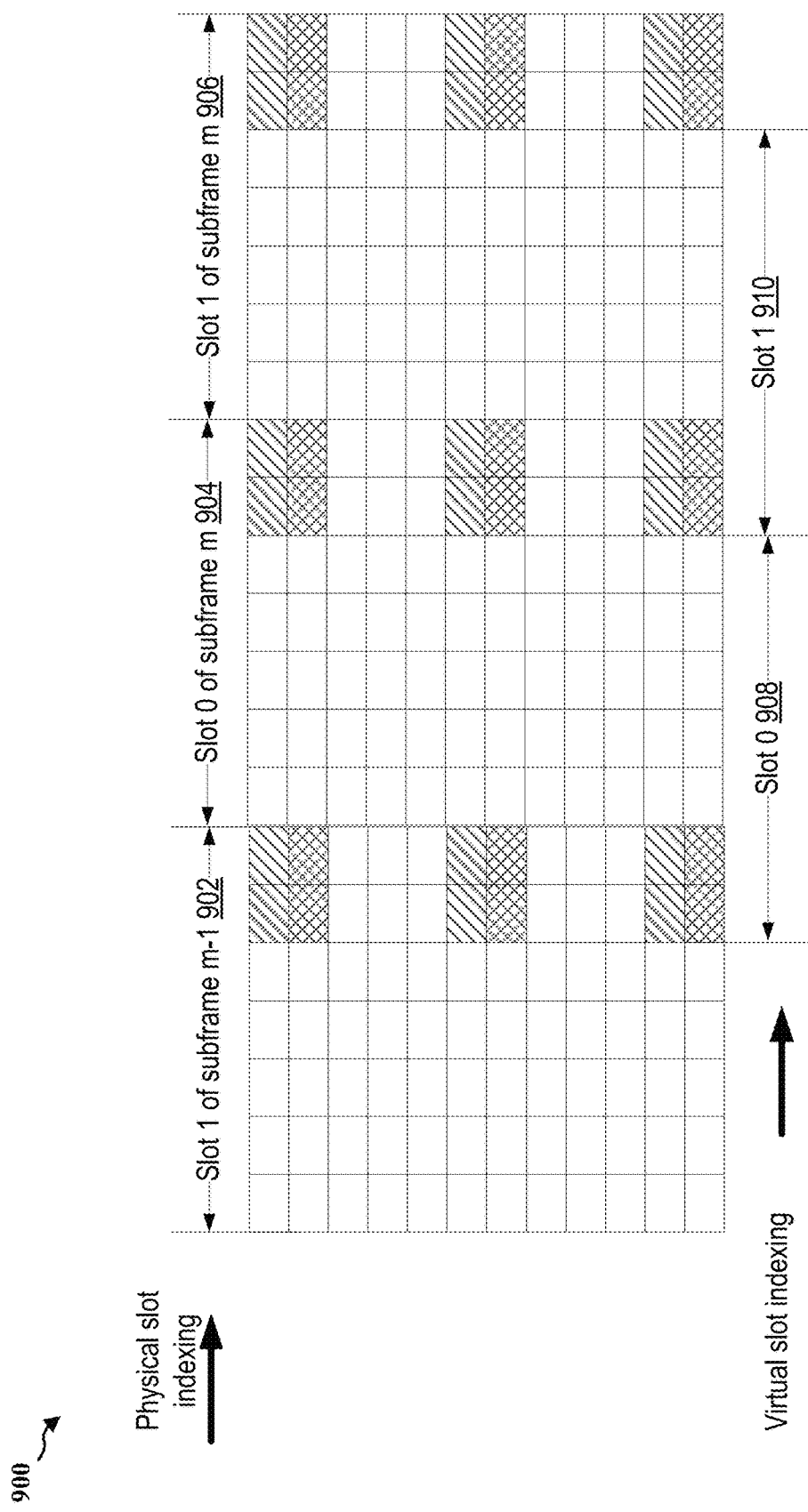
FIG. 9 is a diagram illustrating an aspect of one or more virtual slots for DM-RS in accordance with various aspects of the present disclosure.

FIG. 9 is a diagram illustrating a non-limiting example of a downlink subframe structure 900 including new slot indexing or virtual slot indexing. In an aspect, downlink subframe structure 900 may have physical slot indexing including multiple subframe slots 902, 904, and 906 each having DM-RS located in the last two symbols. According to the present aspects, UE 104 may recognize new DM-RS symbol locations, such as in symbols 1 and 2 in slot 1 902 in order to facilitate early decoding. In addition, according to the present aspects, it may also be possible to omit transmissions in the last symbol(s) in a slot in order to better facilitate early decoding. For example, eNB 102 may transmit and/or UE 104 may recognize only the first 6 symbols for slot TTI transmissions. Alternatively, or in addition, in another aspect, for example, the UE 104 may be configured to recognize a virtual slot for DM-RS based transmissions in which a virtual slot does not need to align with a physical slot. As shown, downlink subframe structure 900 may include virtual slot 0 908 and virtual slot 1 910, both of which may include DM-RS in the first two symbols of the virtual slots. Thus, in this case, a virtual slot may include symbols 5 and 6 of slot m and symbols 0, 1, 2, 3, and 4 of symbol m+1, such that DM-RS is front-loaded.

Figure 10:
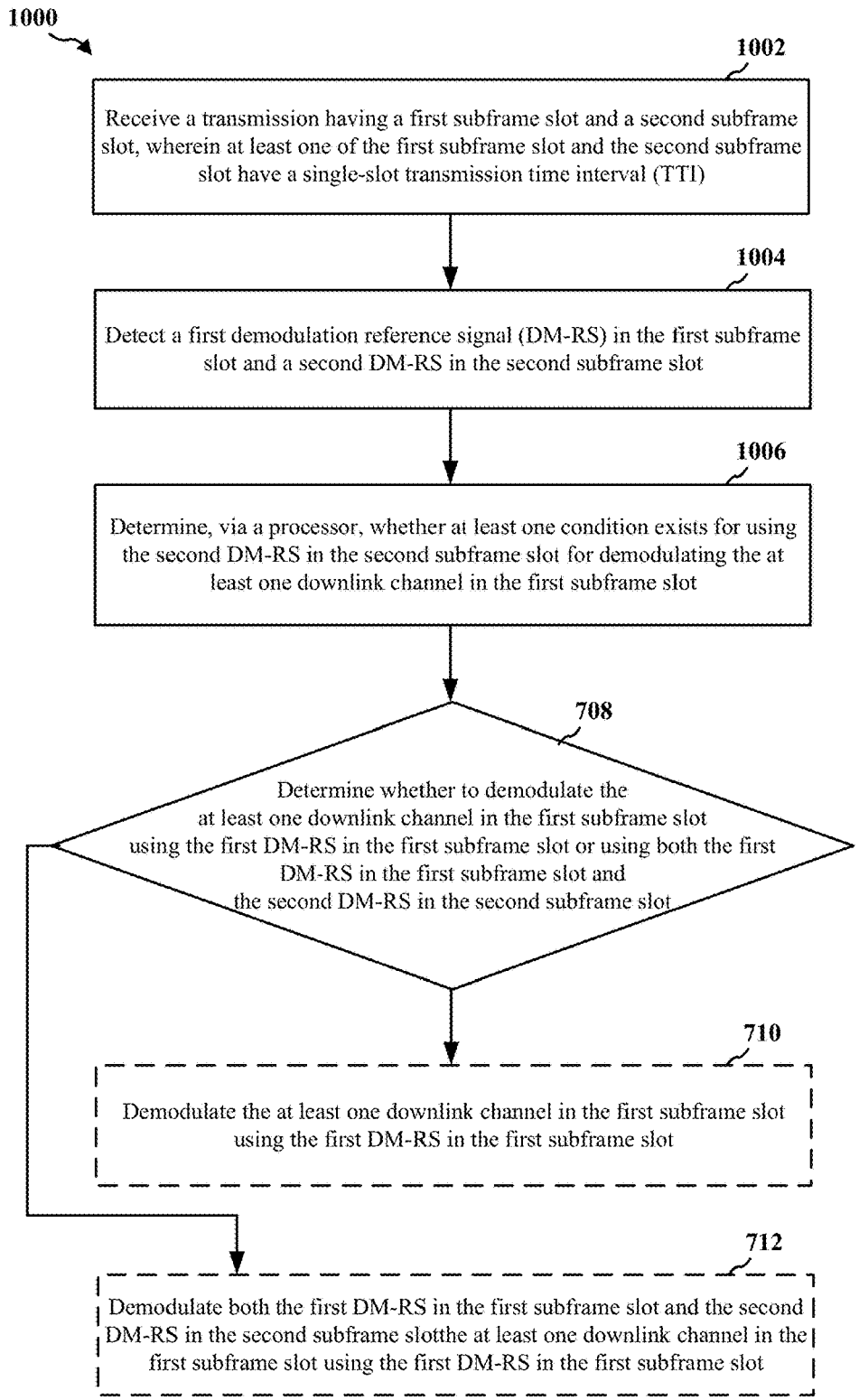
FIG. 10 is a flow diagram of an aspect of managing conditional utilization of reference signals in one slot for a received transmission in another slot, which may be executed by the reference signal utilization component of FIG. 4.

Referring to FIG. 10, a UE such as UE 104 (FIGS. 1 and 4) may include one or more processors to perform an aspect of a method 1000 for managing conditional DM-RS utilization during wireless communication. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 1002, the method 1000 may include receiving a transmission having a first subframe slot and a second subframe slot, wherein at least one of the first subframe slot and the second subframe slot have a single-slot transmission time interval (TTI). For example, in an aspect, UE 104 and/or processor 1204 (FIG. 12) may execute reference signal utilization component 420 to receive a transmission 402 on downlink channel 121-*b* of communication link 120 from base station 102. The transmission may have a subframe slot 404 and a subframe slot 406. In some instances, at least one of subframe slot 404 and subframe slot 406 may have a single-slot TTI.

In an aspect, at block 1004, the method 1000 may include detecting a first demodulation reference signal (DM-RS) in the first subframe slot and a second DM-RS in the second subframe slot. For example, in an aspect, UE 104 and/or processor 1204 (FIG. 12) may execute reference signal utilization component 420 and/or detection component 422 to detect a DM-RS 408 in the subframe slot 404 and a DM-RS 410 in the subframe slot 406. In an example, UE 104 and/or processor 1204 (FIG. 12) may execute reference signal utilization component 420 and/or detection component 422 to detect the first DM-RS in at least one resource block of the first subframe slot and detect the second DM-RS in at least one resource block of the second subframe slot. In another example, first DM-RS in the first subframe slot and the second DM-RS in the second subframe slot are associated with a same group of antenna ports. In a further example, the first DM-RS in the first subframe slot and the second DM-RS in the second subframe slot are associated with an OCC of length 2 or of length 4.

Further, in an instance, the condition may comprise an indication to use the second DM-RS in the second subframe slot for demodulating the at least one downlink channel in the first subframe slot.

In another aspect of method 1000, the indication to use the second DM-RS further comprises at least one of a known RRC configuration associated with using the second DM-RS, or a known downlink control information (DCI) format associated with using the second DM-RS.

In another aspect of method 1000, the indication to use the second DM-RS further comprises an identifier of other resource elements in a same slot to be used for demodulation.

In another aspect of method 1000, the indication to use the second DM-RS further comprises an implicit indication associated with using the second DM-RS.

In another aspect of method 1000, the implicit indication comprises at least one of a known rank transmission scheduled in the first subframe slot, or a control signal transmitted in the second subframe slot for a scheduled data transmission in the first subframe slot.

In an aspect, at block 1006, the method 1000 may include determining, via a processor, whether at least one condition exists for using the second DM-RS in the second subframe slot for demodulating at least one downlink channel in the first subframe slot. For example, in an aspect, UE 104 and/or processor 1204 (FIG. 12) may execute reference signal utilization component 420 and/or determination component 424 to determine whether at least one condition exists for using the DM-RS 410 in the subframe slot 406 for demodulating the at least one downlink channel 121-*b* in the subframe slot 404. In an example, UE 104 and/or processor 1204 (FIG. 12) may execute reference signal utilization component 420 and/or determination component 424 to determine for each of the at least one resource block of the first subframe slot and for each of the at least one resource block of the second subframe slot.

In an aspect, at block 1008, the method 1000 may include determining whether to demodulate the at least one downlink channel in the first subframe slot using the first DM-RS in the first subframe slot or using both the first DM-RS in the first subframe slot and the second DM-RS in the second subframe slot based on whether the at least one condition exists. For example, in an aspect, UE 104 and/or processor 1204 (FIG. 12) may execute reference signal utilization component 420 and/or determination component 424 to determine whether to demodulate the at least one downlink channel 121-*b* in the first subframe slot 404 using the first DM-RS 408 in the first subframe slot 404 or to demodulate both the first DM-RS 408 in the first subframe slot 404 and the second DM-RS 410 in the second subframe slot 406 based on whether the at least one condition exists.

In an aspect, at optional block 1010, the method 1000 may include demodulating the at least one downlink channel in the first subframe slot using the first DM-RS in the first subframe slot. For example, in an aspect, UE 104 and/or processor 1204 (FIG. 12) may execute reference signal utilization component 420 and/or demodulation component 426 to demodulate the at least one downlink channel 121-*b* in the subframe slot 404 using the DM-RS 408 in the subframe slot 404.

In an aspect, at optional block 1012, the method 1000 may include demodulating both the first DM-RS in the first subframe slot and the second DM-RS in the second subframe slot. For example, in an aspect, UE 104 and/or processor 1204 (FIG. 12) may execute reference signal utilization component 420 and/or demodulation component 426 to demodulate both the DM-RS 408 in the subframe slot 404 and the DM-RS 410 in the subframe slot 406.

In another aspect of method 1000, UE 104 and/or processor 1204 (FIG. 12) may execute reference signal utilization component 420 to perform channel rate matching around the first DM-RS and the second DM-RS in the second subframe slot when at least one channel scheduled in the second subframe slot is transmitted with a set of antenna ports in an antenna port group different from the antenna port group in the second subframe slot.

In another aspect of method 1000, the first DM-RS in the first subframe slot corresponds to a first group of antenna ports and the second DM-RS in the second subframe slot corresponds to a second group of antenna ports different from the first group of antenna ports.

In another aspect of method 1000, the first DM-RS in the first subframe slot and the second DM-RS in the second subframe slot are each associated with a different length of an OCC.

In another aspect of method 1000, UE 104 and/or processor 1204 (FIG. 12) may execute reference signal utilization component 420 to determine a resource availability in the first subframe slot corresponding to a number of available resource elements for a data channel, compare the resource availability with a threshold, and scale a transport block size for the first subframe slot based on the comparison.

In another aspect of method 1000, the threshold is at least one of a predetermined value or a value indicated by a network.

In another aspect of method 1000, UE 104 and/or processor 1204 (FIG. 12) may execute reference signal utilization component 420 to share a HARQ process between the at least one downlink channel having the single-slot TTI and at least one other downlink channel included in a downlink subframe, wherein the at least one other downlink channel has a subframe length TTI.

In another aspect of method 1000, UE 104 and/or processor 1204 (FIG. 12) may execute reference signal utilization component 420 to maintain at least one first HARQ process for the at least one downlink channel having the single-slot TTI, maintain at least one second HARQ process for at least one other downlink channel included in a downlink subframe, wherein the at least one other downlink channel has a subframe length TTI, and partition a soft buffer for storing symbols for the at least one first HARQ process and the at least one second HARQ process.

In another aspect of method 1000, a same precoding and power are used for both the first DM-RS in the first subframe slot and the second DM-RS in the second subframe slot.

In another aspect of method 1000, UE 104 and/or processor 1204 (FIG. 12) may execute reference signal utilization component 420 to receive a power difference indication that identifies a power difference between the first subframe slot and the second subframe slot, and wherein the first DM-RS in the first subframe slot and the second DM-RS in the second subframe slot are demodulated, respectively, based on the power difference.

In another aspect of method 1000, UE 104 and/or processor 1204 (FIG. 12) may execute reference signal utilization component 420 to demodulate the at least one downlink channel in the first subframe slot using the first DM-RS in the first subframe slot or both the first DM-RS in the first subframe slot and the second DM-RS in the second subframe slot.

In another aspect of method 1000, the first subframe slot comprises a set of symbols including one or more symbols in a slot of a first subframe, and one or more symbols in a slot of a second subframe.

In another aspect of method 1000, the first subframe slot and the second subframe slot correspond to at least one of a same subframe or a different subframe.

In another aspect of method 1000, the second subframe slot precedes in time at least one of the first subframe slot or the second subframe slot.

Figure 11:
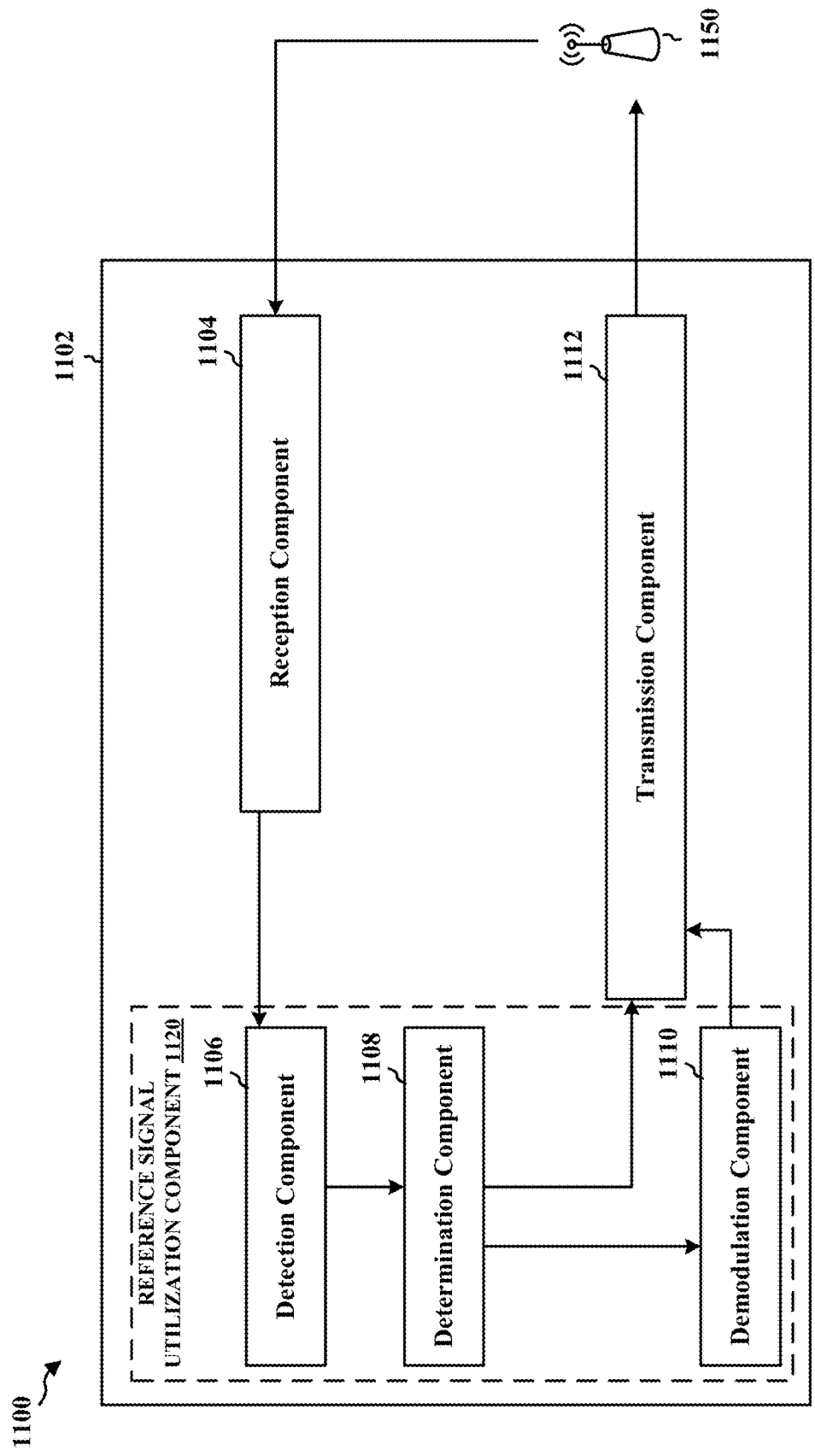
FIG. 11 is a conceptual data flow diagram illustrating the data flow between different means/components in an exemplary apparatus including a reference signal utilization component for managing conditional utilization of reference signals in one slot for a received transmission in another slot in accordance with various aspects of the present disclosure.

FIG. 11 is a conceptual data flow diagram 1100 illustrating the data flow between different means/components in an exemplary apparatus 1102 that includes reference signal utilization component 1120, which may be the same as or similar to reference signal utilization component 420 for managing conditional utilization of downlink reference signals. The apparatus may be a UE, which may include UE 104 of FIGS. 1 and 4. The apparatus includes a reception component 1104 that receives a transmission having a first subframe slot and a second subframe slot, wherein at least one of the first subframe slot and the second subframe slot have a single-slot transmission time interval TTI, a detection component 1106 that detects a first DM-RS in the first subframe slot and a second DM-RS in the second subframe slot, a determination component 1108 that determines whether at least one condition exists for using the second DM-RS in the second subframe slot for demodulating at least one downlink channel in the first subframe slot, and determine whether to demodulate the at least one downlink channel in the first subframe slot using the first DM-RS in the first subframe slot or using both the first DM-RS in the first subframe slot and the second DM-RS in the second subframe slot based on whether the at least one condition exists, demodulation component 1110 that demodulates the at least one downlink channel in the first subframe slot using the first DM-RS in the first subframe slot or both the first DM-RS in the first subframe slot and the second DM-RS in the second subframe slot, and a transmission component 1112 that transmits one or more signals from apparatus 1102 to a network entity 1150 (such as a base station or eNodeB).

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
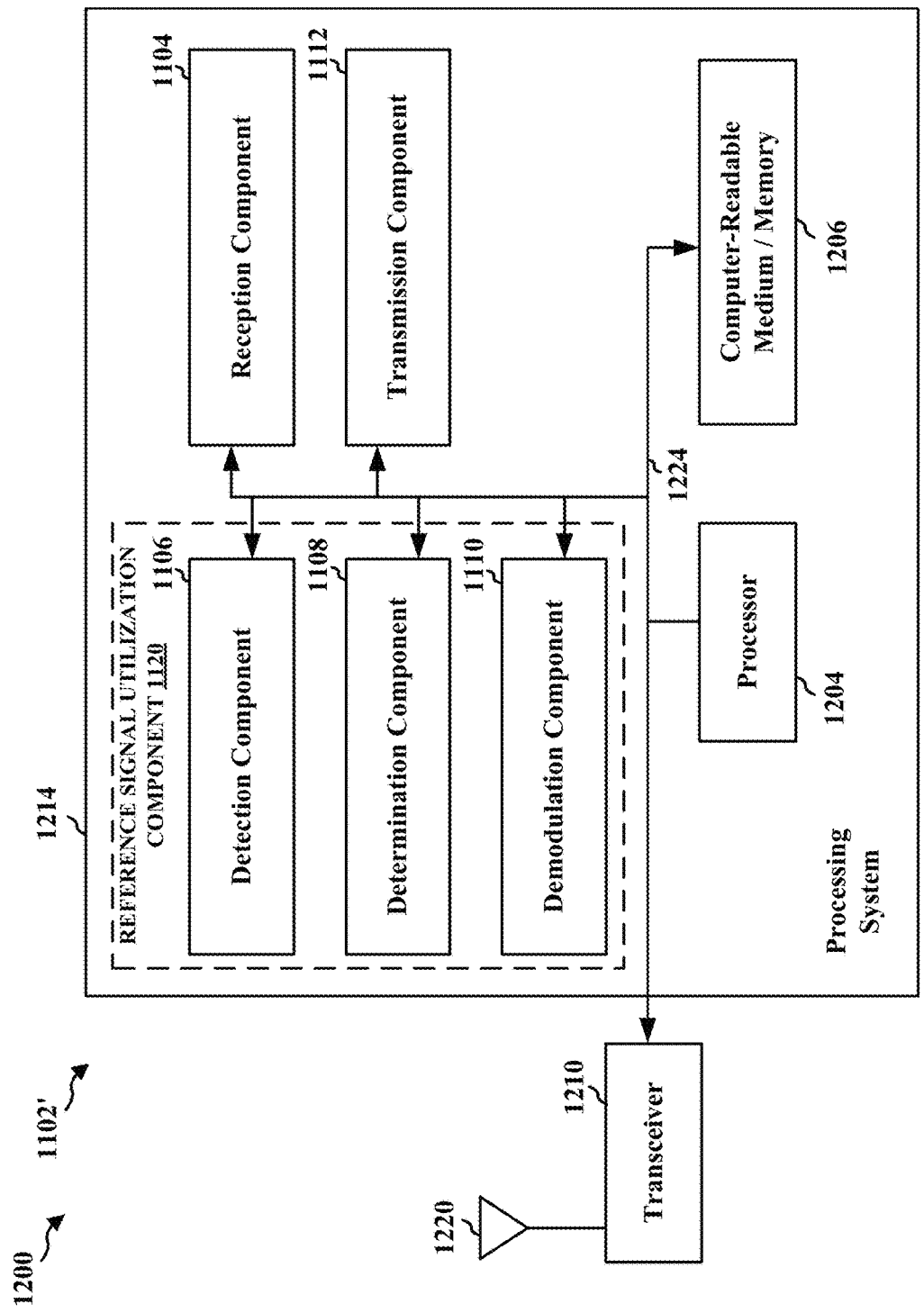
FIG. 12 is a diagram illustrating an example of a hardware implementation for an apparatus employing a processing system including a reference signal utilization component for managing utilization of reference signals in one slot for a received transmission in another slot in accordance with various aspects of the present disclosure.

FIG. 12 is a diagram 1200 illustrating an example of a hardware implementation for an apparatus 1102' employing a processing system 1214 that includes reference signal utilization component 1120 (FIG. 11), which may be the same as or similar to reference signal utilization component 420 for managing conditional utilization of downlink reference signals. The processing system 1214 may be implemented with a bus architecture, represented generally by the bus 1224. The bus 1224 may include any number of interconnecting buses and bridges depending on the specific application of the processing system 914 and the overall design constraints. The bus 1224 links together various circuits including one or more processors and/or hardware components, represented by the processor 1204, the components 1104, 1106, 1108, 1110, and 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 910 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, and 1112. The components may be software components running in the processor 1204, resident/stored in the computer readable medium/memory 1206, one or more hardware components coupled to the processor 1204, or some combination thereof.

In one configuration, the apparatus 1102/1102' for wireless communication includes means for receiving a transmission having a first subframe slot and a second subframe slot, wherein at least one of the first subframe slot and the second subframe slot have a single-slot transmission time interval (TTI); means for detecting a first demodulation reference signal (DM-RS) in the first subframe slot and a second DM-RS in the second subframe slot; means for determining, via a processor, whether at least one condition exists for using the second DM-RS in the second subframe slot for demodulating at least one downlink channel in the first subframe slot; and means for determining whether to demodulate the at least one downlink channel in the first subframe slot using the first DM-RS in the first subframe slot or using both the first DM-RS in the first subframe slot and the second DM-RS in the second subframe slot based on whether the at least one condition exists; and means for demodulating the at least one downlink channel in the first subframe slot using the first DM-RS in the first subframe slot or both the first DM-RS in the first subframe slot and the second DM-RS in the second subframe slot. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Further disclosure of the present aspects relating to usage of downlink reference signals in one slot for demodulation of a transmission in another slot is included in the Appendix.

Thus, based on the foregoing, the present aspects address issues such as, but not limited to: possible UE-RS enhancements, such as different signal densities and earlier-occurring symbols to help in the symbol processing timeline; a reduction by a factor of 2 of the frequency resources used for both UL and DL, where in some cases a 2 RB minimum assignment may be used to keep the TBS size unchanged, while in other cases a 1 RB as minimum assignment can be used, and then the TB size can be scaled by 2; CSI feedback is managed to account for the total number of available resources, e.g., report for 1 ms vs. 0.5 ms transmission to take into account interference difference, and also including possible reuse of the current feedback mechanism but with a remapping to a different TBS table; a design that can reuse the existing CSI-RS and IMIt patterns; the handling of DM-RS present in different slots, and the handling of new DM-RS patterns vs. existing DM-RS patterns; handling of TBS where resource availability can be different in the first slot and the second slot, including cases where the TBS determination be slot dependent, and including cases where the control region differs in size; HARQ process handling for 1-slot and 1-ms TTI; and DM-RS position considerations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communications, comprising:
   receiving a transmission having a first subframe slot and a second subframe slot, wherein at least one of the first subframe slot and the second subframe slot have a single-slot transmission time interval (TTI); and
   detecting a first demodulation reference signal (DM-RS) in the first subframe slot and a second DM-RS in the second subframe slot, wherein each of the first DM-RS and the second DM-RS are front-loaded in the first subframe slot and the second subframe slot, wherein detecting the first DM-RS in the first subframe slot and the second DM-RS in the second subframe slot further comprises detecting the first DM-RS in a first portion of symbols of the first subframe slot and the second DM-RS in a second portion of symbols of the second subframe slot, and
   wherein the first portion of symbols and the second portion of symbols correspond to a first six symbols in each of the first subframe slot and the second subframe slot.

2. The method of claim 1, wherein first DM-RS in the first subframe slot and the second DM-RS in the second subframe slot are associated with a same group of antenna ports.

3. The method of claim 1, wherein the first DM-RS in the first subframe slot and the second DM-RS in the second subframe slot are associated with an orthogonal cover code (OCC) of length 2 or of length 4.

4. The method of claim 1, wherein the first DM-RS in the first subframe slot corresponds to a first group of antenna ports and the second DM-RS in the second subframe slot corresponds to a second group of antenna ports different from the first group of antenna ports.

5. The method of claim 1, wherein the first DM-RS in the first subframe slot and the second DM-RS in the second subframe slot are each associated with a different length of an orthogonal cover code (OCC).

6. The method of claim 1, further comprising demodulating at least one downlink channel in the first subframe slot using the first DM-RS in the first subframe slot or both the first DM-RS in the first subframe slot and the second DM-RS in the second subframe slot.

7. The method of claim 1, wherein the first subframe slot and the second subframe slot correspond to a same subframe or a different subframe.

8. The method of claim 1, wherein the second subframe slot precedes in time the first subframe slot.

9. The method of claim 1, wherein the first DM-RS is omitted from a third portion of symbols of the first subframe slot and the second DM-RS is omitted from a fourth portion of symbols of the second subframe slot.

10. The method of claim 9, wherein the third portion of symbols and the fourth portion of symbols correspond to one or more last symbols in each of the first subframe slot and the second subframe slot.

11. An apparatus for wireless communication, comprising:
 means for receiving a transmission having a first subframe slot and a second subframe slot, wherein at least one of the first subframe slot and the second subframe slot have a single-slot transmission time interval (TTI); and
 means for detecting a first demodulation reference signal (DM-RS) in the first subframe slot and a second DM-RS in the second subframe slot, wherein each of the first DM-RS and the second DM-RS are front-loaded in the first subframe slot and the second subframe slot, wherein means for detecting the first DM-RS in the first subframe slot and the second DM-RS in the second subframe slot further comprises means for detecting the first DM-RS in a first portion of symbols of the first subframe slot and the second DM-RS in a second portion of symbols of the second subframe slot, and
 wherein the first portion of symbols and the second portion of symbols correspond to a first six symbols in each of the first subframe slot and the second subframe slot.

12. The apparatus of claim 11, wherein the first DM-RS is omitted from a third portion of symbols of the first subframe slot and the second DM-RS is omitted from a fourth portion of symbols of the second subframe slot.

13. The apparatus of claim 12, wherein the third portion of symbols and the fourth portion of symbols correspond to one or more last symbols in each of the first subframe slot and the second subframe slot.

14. The apparatus of claim 11, further comprising means for demodulating at least one downlink channel in the first subframe slot using the first DM-RS in the first subframe slot or both the first DM-RS in the first subframe slot and the second DM-RS in the second subframe slot.

15. An apparatus for wireless communication, comprising:
 a transceiver;
 a memory; and
 at least one processor coupled to the memory and configured to:
  receive, via the transceiver, a transmission having a first subframe slot and a second subframe slot, wherein at least one of the first subframe slot and the second subframe slot have a single-slot transmission time interval (TTI); and
  detect a first demodulation reference signal (DM-RS) in the first subframe slot and a second DM-RS in the second subframe slot, wherein each of the first DM-RS and the second DM-RS are front-loaded in the first subframe slot and the second subframe slot, wherein the processor configured to detect the first DM-RS in the first subframe slot and the second DM-RS in the second subframe slot is further configured to detect the first DM-RS in a first portion of symbols of the first subframe slot and the second DM-RS in a second portion of symbols of the second subframe slot, and
  wherein the first portion of symbols and the second portion of symbols correspond to a first six symbols in each of the first subframe slot and the second subframe slot.

16. The apparatus of claim 15, wherein the first DM-RS is omitted from a third portion of symbols of the first subframe slot and the second DM-RS is omitted from a fourth portion of symbols of the second subframe slot.

17. The apparatus of claim 16, wherein the third portion of symbols and the fourth portion of symbols correspond to one or more last symbols in each of the first subframe slot and the second subframe slot.

18. The apparatus of claim 15, wherein the processor is configured to demodulate at least one downlink channel in the first subframe slot using the first DM-RS in the first subframe slot or both the first DM-RS in the first subframe slot and the second DM-RS in the second subframe slot.

19. A non-transitory computer-readable medium storing computer executable code, comprising code for:
 receiving a transmission having a first subframe slot and a second subframe slot, wherein at least one of the first subframe slot and the second subframe slot have a single-slot transmission time interval (TTI); and
 detecting a first demodulation reference signal (DM-RS) in the first subframe slot and a second DM-RS in the second subframe slot, wherein each of the first DM-RS and the second DM-RS are front-loaded in the first subframe slot and the second subframe slot, wherein code for detecting the first DM-RS in the first subframe slot and the second DM-RS in the second subframe slot further comprises code for detecting the first DM-RS in a first portion of symbols of the first subframe slot and the second DM-RS in a second portion of symbols of the second subframe slot, and
 wherein the first portion of symbols and the second portion of symbols correspond to a first six symbols in each of the first subframe slot and the second subframe slot.

20. The non-transitory computer-readable medium of claim 19, wherein the first DM-RS is omitted from a third portion of symbols of the first subframe slot and the second DM-RS is omitted from a fourth portion of symbols of the second subframe slot.

21. The non-transitory computer-readable medium of claim 20, wherein the third portion of symbols and the fourth portion of symbols correspond to one or more last symbols in each of the first subframe slot and the second subframe slot.

22. The non-transitory computer-readable medium of claim 19, further comprising code for demodulating at least one downlink channel in the first subframe slot using the first DM-RS in the first subframe slot or both the first DM-RS in the first subframe slot and the second DM-RS in the second subframe slot.

* * * * *